United States Patent [19]

Takasaki et al.

[11] Patent Number: 5,631,829
[45] Date of Patent: May 20, 1997

[54] AUTOMOBILE DRIVING TORQUE CONTROL SYSTEM FOR CONTROLLING TORQUE DISTRIBUTION BETWEEN FRONT AND REAR ROAD WHEELS

[75] Inventors: Toshiharu Takasaki, Sagamihara; Tomoyuki Hara, Hadano, both of Japan

[73] Assignee: Nissan Motor Co., Ltd., Yokohama, Japan

[21] Appl. No.: 364,244

[22] Filed: Dec. 27, 1994

[30] Foreign Application Priority Data

Dec. 28, 1993 [JP] Japan .................. 5-337014

[51] Int. Cl.⁶ ................................ B60K 17/346
[52] U.S. Cl. ............. 364/424.098; 364/424.045; 364/426.01; 180/248
[58] Field of Search .............. 364/424.05, 424.1, 364/426.01, 426.02, 426.03; 180/197, 244, 248, 249; 192/103 A

[56] References Cited

U.S. PATENT DOCUMENTS

| | | | |
|---|---|---|---|
| 4,699,236 | 10/1987 | Morisawa et al. | 180/249 |
| 4,967,869 | 11/1990 | Nagaoka et al. | 180/244 |
| 4,982,809 | 1/1991 | Nakamura et al. | 180/248 |
| 5,002,147 | 3/1991 | Tezuka et al. | 180/248 X |
| 5,168,955 | 12/1992 | Naito | 180/248 X |
| 5,195,037 | 3/1993 | Tezuka | 180/248 X |
| 5,246,408 | 9/1993 | Kobayashi | 475/221 |
| 5,262,950 | 11/1993 | Nakayama | 364/424.05 |
| 5,270,930 | 12/1993 | Ito et al. | 364/424.1 |

FOREIGN PATENT DOCUMENTS 1-204826  8/1989  Japan.

*Primary Examiner*—Collin W. Park
*Attorney, Agent, or Firm*—Foley & Lardner

[57] ABSTRACT

An automobile driving-torque distribution control system for controlling a torque distribution between front and rear road wheels, comprises a torque-distribution adjustment mechanism responsive to a control signal for adjusting a distribution of driving torque between the front and rear wheels, sensors for detecting front and rear wheel speeds, and a controller for producing the control signal based on the difference between the front and rear wheel speeds. The controller includes a correction circuit for correcting the control signal value, to keep the control signal value at a designated torque-distribution limiting value when satisfying both a first condition in which the wheel-speed difference decreases to a value below a predetermined threshold, and a second condition in which an elapsed time calculated from the time when the first condition has been satisfied, is less than a predetermined time period.

7 Claims, 8 Drawing Sheets

AUTOMOBILE DRIVING TORQUE CONTROL SYSTEM FOR CONTROLLING TORQUE DISTRIBUTION BETWEEN FRONT AND REAR ROAD WHEELS

BACKGROUND OF THE INVENTION

1. Field of the Invention

The present invention relates to an automobile driving torque distribution control system for controlling a torque distribution between front and rear drive wheels, and specifically to a control system for four-wheel drive vehicles which system is capable of determining a driving torque distribution ratio between front and rear drive wheels depending on a wheel speed difference or a revolution speed difference between the front and rear road wheels.

2. Description of the Prior Art

There have been proposed and developed various four-wheel drive vehicles with a driving torque distribution controller in which a driving torque distribution ratio between front and rear drive wheels can be variably controlled depending on driving conditions of the vehicle. As is generally known, there are two types of four-wheel drive vehicles, one being a front-engine, rear-wheel drive base mode four-wheel drive vehicle which operates usually at a rear-wheel drive mode, and the other being a front-engine, front-wheel drive base mode four-wheel drive vehicle which operates usually at a front-wheel drive mode. Such a conventional driving torque distribution control system traditionally includes a variable driving-torque adjustment device, for example, a variable torque clutch mechanism, a differential limiting device such as a limited slip center differential, or the like, which device is placed in a power train between front and rear drive wheels for variably adjusting a driving torque distribution ratio between the front and rear wheels by varying its clutch engaging force to a desired value. Two general types of variable torque clutch mechanisms are used: hydraulic pressure operated clutch and electromagnetic clutch. The former acts to vary a clutch engaging force by way of adjustment of a fluid pressure applied to its clutch piston, while the latter acts to vary frictional forces between clutch plates by way of adjustment of a value of exciting current applied to its proportional solenoid. One such conventional driving torque distribution control system has been disclosed in Japanese Patent Provisional Publication No. 1-204826. In general, when engine power is carried from the power train to drive wheels, there is some loss of traction owing to characteristics of tires. In particular, traction loss or slip loss is great during acceleration of the vehicle, as compared with during constant-speed driving. On the driving torque distribution control system of the Japanese Patent Provisional Publication No. 1-204826, in case of front-engine, rear-wheel drive base mode four-wheel drive vehicles, during constant-speed driving, a driving torque distribution ratio between front and rear road wheels is designed to be set to a particular ratio of 0:100% according to which the entire driving torque is transmitted only to the rear drive wheels. On the other hand, when there is a great wheel speed difference or great revolution speed difference between the front and rear wheels, for example, during acceleration, i.e., in case that the difference obtained by subtracting one detected wheel speed of the auxiliary drive wheel (front wheel) from the other detected wheel speed of the main drive wheel (rear wheel) is positive, the torque distribution controller determines that acceleration slip occurs at the main drive wheels (rear wheels) owing to excessive application of driving torque thereto, irrespective of tire characteristics, road conditions such as a coefficient of friction of a road surface, and cornering conditions such as a steering angle. Depending on the wheel speed difference or the wheel revolution speed difference, the controller calculates a target torque distribution ratio and generates a control signal based on the target torque distribution ratio to the above-noted variable driving torque adjustment device. The driving-torque adjustment device is responsive to the control signal to transfer a designated amount of driving torque from the main drive wheels to the auxiliary drive wheels, thereby suppressing wheel spin (acceleration slip) at the rear drive wheels. On front-engine, rear-drive base mode four-wheel drive vehicles, the reasons for usually setting the driving torque distribution ratio between front and rear road wheels to 0:100% are described hereinafter.

As is generally known, the greater the distribution of driving force applied to the auxiliary drive wheels (front wheels), the more a driving stability of the vehicle is enhanced. In other words, as the distribution ratio of driving force is shifted from 0:100% to 50%:50%, the drivability or running stability can be improved. However, in such a case, fuel consumption may be degraded. In order to improve fuel consumption, the driving-torque distribution ratio between the auxiliary drive wheel and the main drive wheel is generally set to 0:100% in the event that there is less wheel speed difference or less wheel revolution speed, for instance, during usual running of the vehicle such as constant-speed driving.

The controller of the previously-noted conventional driving torque distribution control system traditionally utilizes a predetermined data map to calculate or derive a desired driving-torque distribution ratio depending on the wheel speed difference. For the purpose of enhancing a responsiveness of the driving-torque distribution control, the data map usually consists of a particular driving torque characteristic curve, in which a distribution of driving torque transmitted to the auxiliary drive wheel is simply increased from an origin (a point at which the wheel speed difference is zero) in accordance with an increase in the detected wheel speed difference. In the previously-noted conventional driving torque distribution control system, there is some problem as explained below.

For instance, in four-wheel drive vehicles with a manual transmission, in the event that engagement and disengagement of the clutch are repeatedly performed to shift up during acceleration, transmission of driving torque to the drive wheels is temporarily stopped during shifting. Thus, the drive wheels tend to roll freely coastingly on the roads with less resistance due to inertia of the vehicle during shifting. Assuming that the outside diameter of the front tires are equal to that of the rear tires, the detected wheel speed difference or wheel revolution speed difference becomes temporarily to zero owing to coasting of each wheel. The vehicle could experience a rapid change of the wheel speed difference down to zero during undesired depression of the clutch pedal accidentally. Also, in four-wheel drive vehicles with an automatic transmission, the vehicle could experience such a rapid change of the wheel speed difference down to zero during automatic shifting operation. In the above-noted cases, the conventional torque control system would determine a driving torque distribution ratio based on the above-explained simple torque characteristic curve memorized in the storage of the controller in the form of a data map, so that the driving-torque distribution ratio between the auxiliary drive wheel and the main drive wheel is set to 0:100% due to the wheel speed difference of zero. In general, since the driving-torque control system consists of a feedback control system based on the detected speed difference or wheel revolution speed difference, there is a delay of response time in the system until the system outputs a newly derived control signal after a predetermined operation time (sampling time) has elapsed. Additionally, there is a delay of mechanical transmission in an actuator included in the driving-torque adjustment device such as a variable torque clutch mechanism or a differential limiting device, after outputting the control signal. Even if the actuator is responsive quickly to the control signal from the control system at real-time, there is a delay of response time owing to the predetermined operation time of the system. Hence, upon the torque distribution ratio between the auxiliary drive wheel (front wheel) and the main drive wheel (rear wheel) is switched quickly to 0:100% during shifting, the wheel speed difference is rapidly increased with a considerable up-gradient (at a steep rate of change in the wheel speed difference), owing to a rapid increase in the wheel speed at the main drive wheels. When the clutch is engaged again after completion of shifting operation, the entire driving torque is transferred to the main drive wheel (rear wheel). There is a possibility that such a rapid change in driving torque causes the rear wheel to slip. In order to suppress such a relatively great wheel speed difference of the front and rear wheels and to adjust the driving-torque distribution to an optimal driving torque distribution condition, the controller derives a new distribution ratio based on the newly detected wheel speed difference. The torque-distribution control signal representative of the new distribution ratio is also generated with the predetermined time delay. In other words, the derived distribution ratio varies at a gradient or control gain based on the predetermined time delay of the system. It will be appreciated that the greater the response-time delay of the system the smaller the control gain. Owing to the additional delay of mechanical transmission of the actuator, there is a possibility that the control gain of the control system can be adjusted to a more smaller value. Due to the delay time, the responsiveness of the conventional torque-distribution control system would be degraded. As is generally known, under the above-mentioned optimal torque-distribution condition, the main drive wheels rotate slightly faster than the auxiliary drive wheels with an optimal slippage (an optimal wheel speed difference) which is determined depending on several factors, such as a car weight, a road surface condition, kinds of tires or the like. As explained previously, in the event that excessive driving torque is rapidly applied to the main drive wheels for a short time, the wheel speed difference between the main drive wheel and the auxiliary drive wheel is rapidly increased Thus, this may result in a great overshoot relative to the optimal slippage at the main drive wheels. Such overshoot causes a great energy loss resulting from slip loss or traction loss. A time duration or interval in which the detected wheel speed difference overshot the optimal wheel speed difference is generally called as a slip-loss time. The energy loss resulting from the undesirable slippage (acceleration-slip) results in degradation of fuel consumption. The energy loss is substantially equivalent to the integral of slip losses accumulated for the slip-loss time. Hence, the conventional torque distribution control system tends to adjust the front- and-rear driving torque distribution to the predetermined optimal distribution condition with a relatively long time interval of slip-loss, owing to the unnegligible time delay resulting from the operation time of the system. To avoid this, if a torque distribution ratio is held to the previous driving-torque distribution ratio already assigned by the control system before the vehicle experience rapid changes in the wheel speed difference, such system may induce another problem. For instance, in the event that the wheel speed difference is rapidly decreased, i.e., when the driving condition of the vehicle is rapidly shifted from an accelerating state to a constant-speed driving state, the slipping condition of the main drive wheels could be rapidly shifted from a great slip state to a less slip state, owing to the torque difference between a great driving torque consumed to accelerate the vehicle against running resistance including acceleration resistance during acceleration anal a small driving torque consumed to run the vehicle at a constant speed during constant-speed driving, with regard to the main drive wheels. Thus, the wheel speed difference could be reduced rapidly, when shifted from the accelerating state to the constant-speed driving state. As previously noted, assuming that a torque distribution ratio is held to the previous distribution ratio already assigned by the control system before a rapid change in the wheel speed difference, the distribution ratio of the auxiliary drive wheel to the main drive wheel is not set to zero (0:100%) but remains held to a relatively great value. In this case, fuel consumption may be generally degraded due to four-wheel drive tendencies.

SUMMARY OF THE INVENTION

Accordingly, it is an object of the invention to provide an improved driving torque control system suitable for four-wheel drive vehicles which avoids the foregoing disadvantages of the prior art.

It is another object of the invention to provide an improved driving torque control system for four-wheel drive vehicles, which is capable of suppressing undesired energy loss resulting from slip loss occurring due to shifting operations.

It is a further object of the invention to provide an improved driving torque control system for four-wheel drive vehicles, which is capable of improving a response in its driving torque distribution control and of suppressing degradation of fuel consumption even in case of a great deviation in rotational conditions between front and rear road wheels, such as a rapid increase or decrease in the wheel speed difference between the front and rear wheels.

The inventors of the present invention have found it advantageous that a proper correction is made to reduce a distribution ratio of driving-torque delivered to the main drive wheels under a particular condition wherein the wheel speed difference between a main drive wheel and an auxiliary drive wheel rapidly rises after it rapidly drops and thus slip loss tends to occur at the main drive wheel, during shifting, for example. It is desirable to properly correct a torque-distribution command value such that the torque-distribution ratio of the auxiliary drive wheel is maintained at a predetermined lower limit after the absolute value of the detected wheel speed difference rapidly drops. In order to prevent undesirable loss of slip at the main drive wheels, it is desirable to maintain an auxiliary drive wheel side target torque-distribution command value at a relatively high level even the wheel speed difference rapidly drops during shifting, for example. The lower limit may be derived as an auxiliary drive wheel side torque-distribution limiting value based on the detected vehicle speed and the detected lateral acceleration. In the event that the wheel speed difference rapidly drops during transition from the accelerating state to the constant-speed driving state, the torque-distribution control system operates to make the above-noted correction of the torque-distribution is made for a predetermined period of time from the time point of the rapid drop of the wheel speed difference, thereby improving fuel consumption. Usually, the target torque-distribution command value is set to a reference torque-distribution command value based on the wheel speed difference. On the other hand, in case that the above-noted correction is made, the target torque-distribution command value is set to the torque-distribution limiting value based on the detected vehicle speed and the detected lateral acceleration. Preferably, the torque-distribution limiting value may be set to be equivalent to the reference torque-distribution command value derived just before the rapid drop in the wheel speed difference, or to be slightly smaller level than the latter.

In order to accomplish the aforementioned and other objects of the invention, a driving-torque distribution control system of an automotive vehicle for controlling a torque distribution between front and rear road wheels, comprises a torque-distribution adjustment means responsive to a control signal for adjusting a distribution of driving torque between the front and rear wheels, a first detection means for detecting a first physical quantity indicative of a rotational condition of the rear wheel, a second detection means for detecting a second physical quantity indicative of a rotational condition of the front wheel, and a torque-distribution control means for producing the control signal based on a deviation between the first and second physical quantities. The torque-distribution control means includes a correction means for correcting a value of the control signal, to keep the control signal value at a designated limiting value when the deviation rapidly drops and rises for a time duration shorter than a predetermined period of time during acceleration. When the deviation rapidly drops and rises for the shorter time duration during acceleration, the torque-distribution control means suppresses a rate of change in the control signal value by keeping the control signal value at the designated limiting value so that an up-gradient of the control signal value is changed to a gentle gradient.

According to another aspect of the invention, a driving-torque distribution control system of an automotive vehicle for controlling a torque distribution between front and rear road wheels, comprises a torque-distribution adjustment means responsive to a control signal for adjusting a distribution of driving torque between the front and rear wheels, a first detection means for detecting a first physical quantity indicative of a rotational condition of the rear wheel, a second detection means for detecting a second physical quantity indicative of a rotational condition of the front wheel, and a torque-distribution control means for producing the control signal based on a deviation between the first and second physical quantities. The torque-distribution control means includes a correction means for correcting a value of the control signal, to keep the control signal value at a designated limiting value for a predetermined period of time when the deviation rapidly drops and thereafter the drop in the deviation continues for a time duration longer than the predetermined period in case of transition from an accelerating state to a constant-speed driving state. When the deviation rapidly drops and thereafter the drop in the deviation continues for the longer time duration in case of transition from the accelerating state to the constant-speed driving state, the torque-distribution control means suppresses a rate of change in the control signal value by keeping the control signal value at the designated limiting value so that an up-gradient of the control signal value is changed to a gentle gradient. The first and second physical quantities are rear and front wheel speeds, respectively.

According to a further aspect of the invention, a driving-torque distribution control system of an automotive vehicle for controlling a torque distribution between front and rear road wheels, one being a main drive wheel and the other being an auxiliary drive wheel, the system comprises a torque-distribution adjustment means responsive to a target torque distribution command value for adjusting a distribution of driving torque between the main and auxiliary drive wheels, a first detection means for detecting a first physical quantity indicative of a rotational condition of the main drive wheel, a second detection means for detecting a second physical quantity indicative of a rotational condition of the auxiliary drive wheel, and a torque-distribution control means for producing the target torque distribution command value at predetermined sampling time intervals, the torque-distribution control means including a calculating means for calculating a reference torque-distribution command value based on a deviation between the first and second physical quantities and for calculating a torque-distribution limiting value based on a lateral acceleration exerted on the vehicle and a vehicle speed. The torque-distribution control means selects the torque-distribution limiting value as the target torque-distribution command value for a predetermined period of time when the reference torque-distribution command value is less than the target torque-distribution command value produced prior to one sampling time interval and the reference torque-distribution command value is below the torque-distribution limiting value. The first and second physical quantities are main and auxiliary drive wheel speeds, respectively. The torque-distribution limiting value may be preset to be equal to or less than the target torque-distribution command value produced prior to one sampling time interval. When the reference torque-distribution command value is less than the target torque-distribution command value produced prior to one sampling time interval and the reference torque-distribution command value is below the torque-distribution limiting value, the torque-distribution control means suppresses a rate of change in the target torque-distribution command value derived at a current sampling time interval by setting the target torque-distribution command value at the torque-distribution limiting value so that an up-gradient of the target torque-distribution command value is decreased. In this case, the torque-distribution limiting value is preset to be slightly less than the target torque-distribution command value produced prior to one sampling time interval, and the target torque-distribution command value is changed to the torque-distribution limiting value in a stepwise fashion after setting the target torque-distribution command value at the torque-distribution limiting value. Alternatively, the torque-distribution limiting value may be preset to be slightly less than the target torque-distribution command value produced prior to one sampling time interval, and the target torque-distribution command value may be gently decreased to the torque-distribution limiting value through a filtering process after setting the target torque-distribution command value at the torque-distribution limiting value.

According to a still further aspect of the invention, a driving-torque distribution control system of a four-wheel drive vehicle with a variable torque transfer for controlling a torque distribution between front and rear road wheels, one being a main drive wheel and the other being an auxiliary drive wheel, the system comprises a transfer clutch mechanism responsive to a control signal for adjusting a distribution of driving torque between the main and auxiliary drive wheels, a main drive wheel speed sensor for detecting a revolution speed of the main drive wheel, an auxiliary drive wheel speed sensor for detecting a revolution speed of the auxiliary drive wheel, and a controller for producing the control signal based on an absolute of a wheel speed difference between the main and auxiliary drive wheels. The controller includes a correction means for correcting a value of the control signal, to provide a designated limiting value required to limit a decrease in the control signal value when the wheel speed difference rapidly drops and rises for a shorter time duration than a predetermined period of time during acceleration and when the wheel speed difference rapidly drops and thereafter the drop in the wheel speed difference continues for a longer time duration than the predetermined period in case of transition from an accelerating state to a constant-speed driving state. The transfer clutch mechanism preferably consists of an electromagnetic multi-disc friction clutch or a magnetic fluid clutch based on magnetic coupling between a magnetic fluid and a powder clutch. The controller operates to set the control signal value at the designated limiting value until the rapid rise in the wheel speed difference when the wheel speed difference rapidly drops and rises for the shorter time duration during acceleration, and to set the control signal value at the designated limiting value for the predetermined period when the wheel speed difference rapidly drops and thereafter the drop in the wheel speed difference continues for the longer time duration in case of transition from the accelerating state to the constant-speed driving state. The designated limiting value consists of an auxiliary-wheel side torque-distribution limiting value which varies depending on both a lateral acceleration exerted on the vehicle and a vehicle speed. The controller operates to set the control signal value at the auxiliary-wheel side torque-distribution limiting value during deceleration and during turning.

DESCRIPTION OF THE PREFERRED EMBODIMENTS

Figure 1:
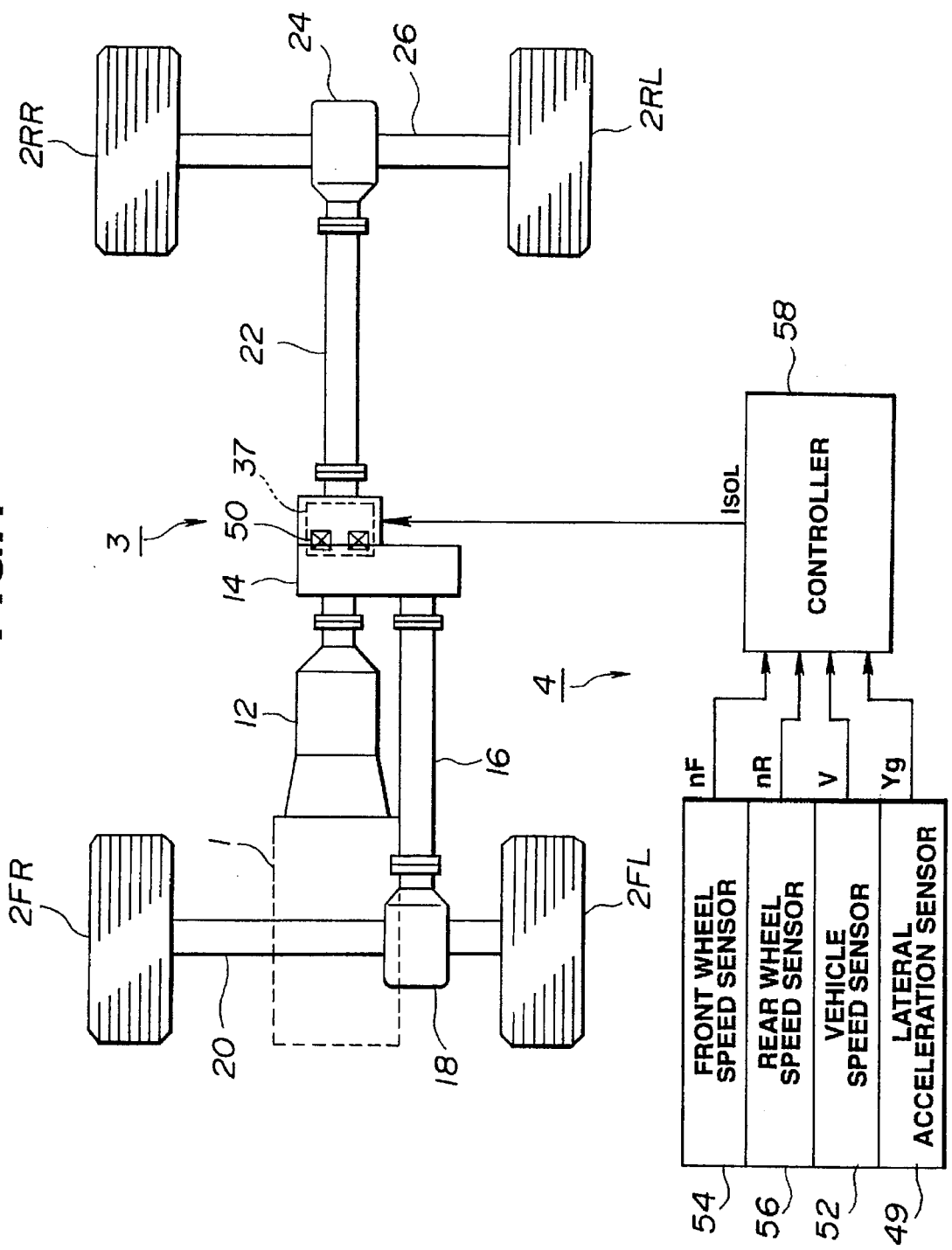
FIG. 1 is schematic block diagram illustrating a driving torque distribution control system according to the invention.
Figure 2:
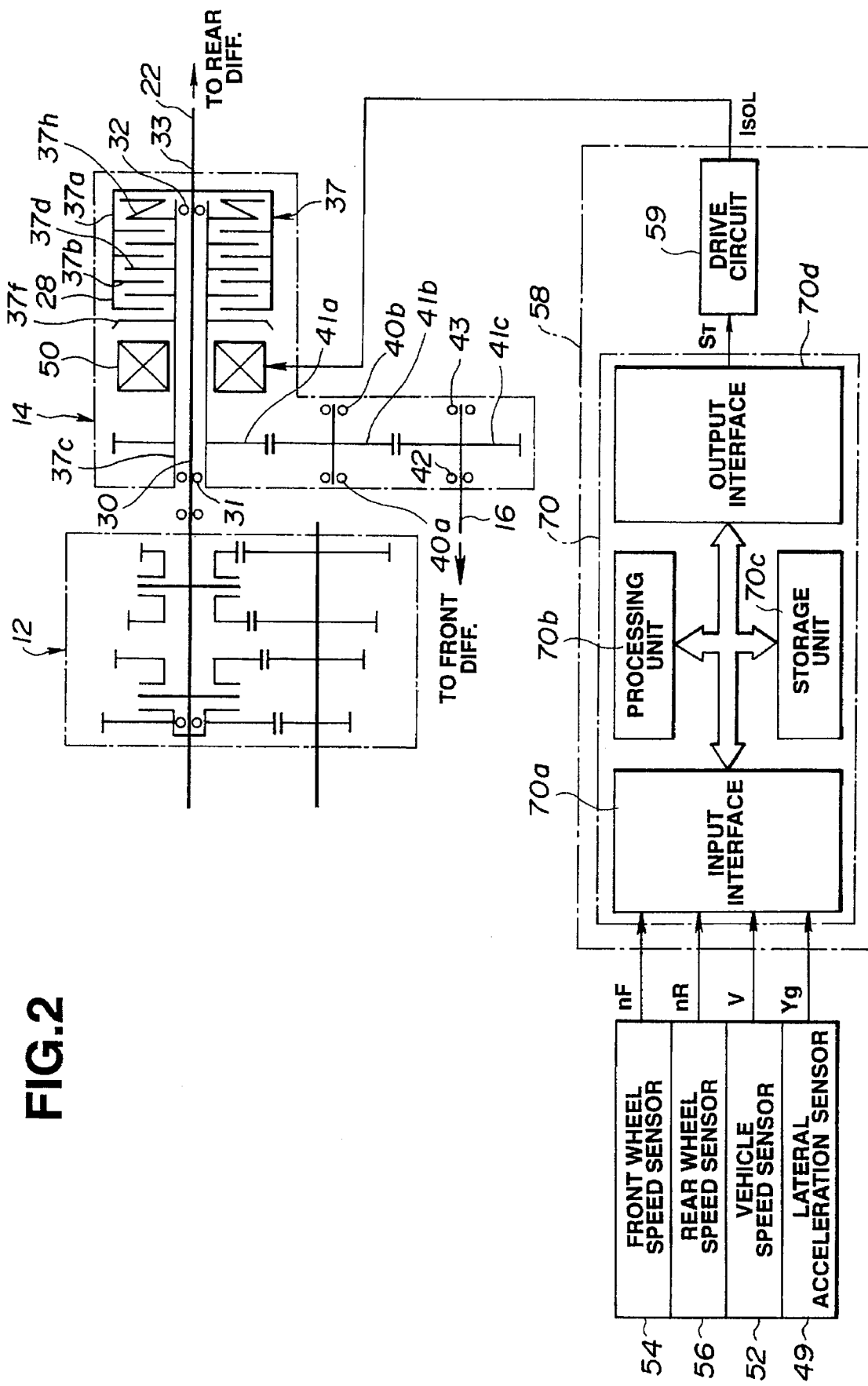
FIG. 2 is a detailed block diagram illustrating one embodiment of the driving torque distribution control system.

Referring now to the drawings, particularly to FIGS. 1 to 5, the driving torque distribution control system of the invention is exemplified in case of a front-engine, rear-wheel drive base mode four-wheel drive vehicles. In FIG. 1, reference numeral denotes an engine serving as a power source, reference numerals 2FL, 2FR, 2RL and 2RR respectively denote front-left, front-right, rear-left, and rear-right road wheels. Reference numeral 3 denotes a power train serving as a driving-torque transmission system, while reference numeral 4 denotes a driving-torque distribution control system according to the invention. Traditionally, the power train 3 includes a transmission 12 which shifts the gear ratio to a designated gear ratio, and a variable torque transfer 14 which divides the torque output from the transmission 12 into the front drive wheels 2FL and 2FR and the rear drive wheels 2RL and 2RR depending on the magnitude of engaging force of a transfer clutch. The front-wheel side driving torque is transmitted from a front-wheel side output shaft 16 through a front differential 18 and front-wheel side drive shafts 20 to the front wheels 2FL and 2FR. The rear-wheel side driving torque is transmitted from a rear-wheel side output shaft 22 (propeller shaft) through a rear differential 24 and rear-wheel side drive shafts 26 to the rear wheels 2RL and 2RR. On the front-engine, rear-wheel drive base mode four-wheel drive vehicles, the two rear wheels function as main drive wheels, while the two front wheels function as auxiliary drive wheels. In the embodiment, the transmission 12 consists of a manually operated transmission. The transmission may consist of an automatically operated transmission. In case of the manual transmission, the power train 3 also includes a clutch (not shown) which connects the engine crankshaft to or disconnects it from the power train. In case of the automatic transmission, power flow is hydraulically controlled so that no power flows to the main drive wheels and the auxiliary drive wheels during shifting. As seen in FIG. 2, the transfer 14 includes a transfer case 28, a transfer input shaft 30 rotatably enclosed in the case 28, a transfer output shaft 33 and a pair of bearings 31 and 32 rotatably supporting the input shaft 30 and the output shaft 33. The left end (viewing FIG. 2) of the input shaft 30 is connected to the transmission output shaft, while the right end of the input shaft 30 is firmly connected to the output shaft 33. The output shaft 33 is coupled with the rear propeller shaft 22.

The transfer 14 also includes an electromagnetic multi-disc clutch mechanism 37 serving as a variable torque transfer clutch which functions to adjust a driving-torque distribution ratio between the front and rear wheels. The clutch mechanism 37 has a clutch drum 37a splined to the input shaft 30, friction plates 37b which are engaged with the clutch drum 37a so as to prevent relative rotation therewith, a clutch hub 37c which is rotatably supported on the outer periphery of the input shaft 30 by way of a needle bearing, friction discs 37d which is engaged with the clutch hub 37c so as to prevent relative rotation therewith, a clutch piston 37f which is axially slidably arranged to cause the friction plates 37b to engage with the friction discs 37d, and an electromagnetic proportional solenoid 50 which is associated with the clutch piston 37f to cause a sliding movement of the clutch piston 37f. The friction plates 37b have a drive connection with the friction discs 37d. A return spring 37h is provided to bias the clutch piston 37f in one axial direction so that the friction plates 37b is usually disengaged from the friction discs 37d. The clutch hub 37c is splined to a first gear 41a. The first gear 41a is meshed with a second gear 41b which is rotatably supported by way of a pair of bearings 40a and 40b. The second gear 41b is meshed with a third gear 41c which is rotatably supported by way of a pair of bearings 42 and 43. In this manner, the clutch mechanism 37 is coupled with the front-wheel side output shaft 16.

Figure 3:
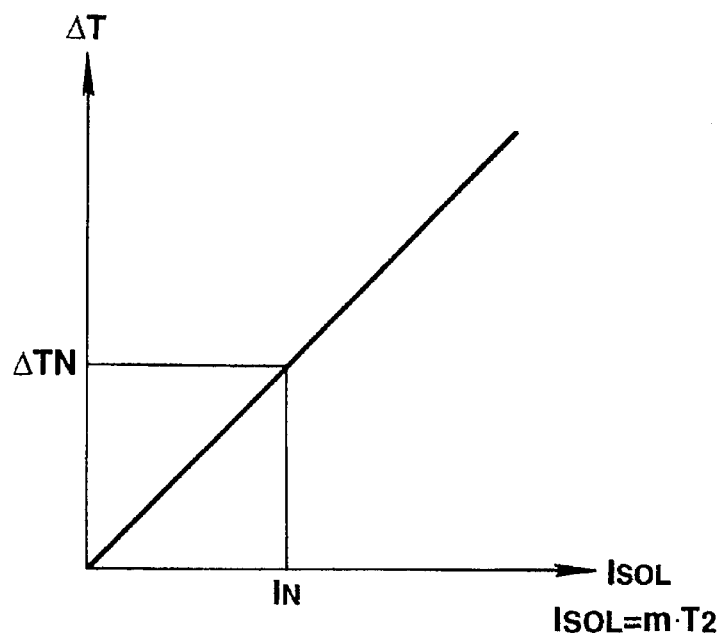
FIG. 3 is a correlative graph illustrating a relation between a command current value $I_{SOL}$ and a torque value $\Delta T$ delivered to the front road wheels in the system of FIG. 2.

With the above-noted arrangement, when a value of an exciting current (command current IsoL) applied to the solenoid 50 of the clutch mechanism 37 is zero, i.e., when the solenoid is deactivated, the friction plates 37b and the friction discs 37d are held disengaged from each other by the bias of the spring 37h. Under this condition, the entire torque transmitted from the transmission output shaft to the transfer input shaft 30 is delivered through the transfer output shaft 33 and the propeller shaft 22 to the rear wheels 2RL and 2RR, so that the vehicle runs at the rear-wheel drive mode. In contrast to the above, when the current value of the command current IsoL is set to a value other than zero, a relative displacement of the clutch piston 37f to the solenoid 50 varies depending on a magnetic field strength of the solenoid 50, thereby producing a frictional force between the friction plates 37b and the friction discs 37d depending on the relative displacement of the clutch piston 37f to the solenoid 50. As a result, a portion of the driving torque transmitted to the transfer is delivered through the output shaft 16 to the front wheels 2FL and 2FR. The torque component transmitted to the front wheels which torque component will be hereinafter denoted by a character "ΔT", is essentially proportional to the value of the command current ISOL, since the torque component ΔT is proportional to the magnetic field strength of the solenoid 50. Thus, the torque characteristic of the torque component ΔT illustrated in FIG. 3 is based on the assumption that the torque component ΔT delivered to the front wheels is linearly increased in accordance with an increase in the command current ISOL. In the embodiment, although the magnetic clutch mechanism 37 consists of an electromagnetic multi-disc friction clutch, a magnetic fluid clutch based on magnetic coupling between conductors, such as a magnetic fluid and a powder clutch, may be used as the clutch mechanism 37 so as to assure a more linear command current ISOL versus front-wheel side driving-torque component ΔT characteristic. On the previously-noted assumption, the driving torque distribution ratio of the front wheel (auxiliary drive wheel) to the rear wheel (main drive wheel) is gradually increased in proportion to the command current value ISOL. Depending on the command current value applied to the solenoid of the transfer clutch mechanism 37, the torque distribution ratio can be varied between 0:100% (ISOL=0) and 50%:50% (ISOL=maximum exciting current value). As compared with a usual hydraulically operated clutch mechanism, the construction of the above-explained magnetic clutch mechanism 37 is simple. Such an electromagnetic clutch mechanism exhibits a relatively high responsiveness. Therefore, upon the command current value ISOL is set to zero, the torque component ΔT transmitted to the front wheels can become zero quickly. That is, the electromagnetic clutch mechanism assures a quick response in a variable adjustment of the driving torque distribution between front and rear wheels. Returning to FIG. 1. the driving torque distribution control system 4 also includes a controller 58 which is responsive to various signals generated from a front-wheel speed sensor 54, a rear-wheel speed sensor 56, a vehicle speed sensor 52, and a lateral acceleration sensor 49 to adjust the command current value ISOL to be applied to the solenoid 50 of the transfer clutch. Each of the wheel speed sensors 54 and 56 may consist of an optical type revolutional speed sensor or an electromagnetic type revolution speed sensor. The front-wheel speed sensor 54 may be placed to detect the number of revolutions of the front-wheel side output shaft 16, while the rear-wheel speed sensor 56 may be placed to detect the number of revolutions of the propeller shaft 22. The detected front and rear wheel speeds nF and nR are input into the controller 58 in the form of a sinusoidal signal. Since the waveform of the sinusoidal signal is correlated to the number of revolutions of the rotational shaft, a number of revolution or an angular velocity of the rotational shaft can be derived by converting the sinusoidal signal to a pulse signal. To calculate a wheel speed, one must take the outside diameter of the tire into account. In order to prevent the detected wheel speed from being affected by changes in outside diameter of a tire such as tire wear, the number of revolution or the angular velocity derived by the pulse signal is utilized as the detected wheel speed. Alternatively, the two front-wheel speed sensors 54 may be provided to detect both right and left front wheel speeds, while the two rear-wheel speed sensors 56 may be provided to detect physical quantities indicative of rotational conditions of first and rear road wheels, such as right and left rear wheel speeds. In this case, the front-wheel speed nF would be estimated by a mean value of the detected revolution speeds of front-right and front-left wheels, while the rear-wheel speed nR would be estimated by a mean value of the detected revolution speeds of rear-right and rear-left wheels. In the embodiment, the front-wheel speed nF is derived from a mean value of the detected numbers of revolutions of the front-right and front-left wheels, while the rear-wheel speed nR is derived from a mean value of the detected numbers of revolutions of the rear-right and rear-left wheels. Also, the wheel speed difference ΔN is derived by subtracting the average front-wheel speed nF from the average rear-wheel speed nR. The vehicle speed sensor 52 outputs a vehicle speed indicative signal V to the controller 58 in the form of a voltage signal. The vehicle speed indicative signal V is representative of a velocity of the vehicle in its longitudinal direction. The lateral acceleration sensor 49 is provided to detect a lateral acceleration exerted on the vehicle body in its lateral direction and to generate a lateral acceleration indicative signal Yg indicative of an absolute value of the detected lateral acceleration. Actually, the lateral acceleration indicative signal Yg is input into the controller 58 in the form of a voltage signal. As indicated in FIG. 2, the controller 58 includes a microcomputer 70 and a drive circuit 59. The drive circuit 59 is connected to the solenoid 50 so as to apply the command current ISOL to the latter. The microcomputer 70 includes an input interface 70a which serves as an analogue to digital converter and receives signals nF, nR, V and Yg respectively produced by the sensors 54, 56, 52 and 49, a processing unit 70b which derives an engaging force of the transfer clutch (a command torque delivered to the front wheels) based on the signal values nF, nR, V and Yg and produces a control signal ST representative of the derived clutch engaging force (the derived command torque), a storage unit 70c consisting of ROM and RAM, and an output interface 70d which serves as a digital to analogue converter and outputs the control signal ST to the drive circuit 59. As hereinafter explained in detail in accordance with the flow chart shown in FIG. 5, the microcomputer 70 of the controller 58 operates to derive a wheel speed difference ΔN between the front and rear wheels on the basis of the detected front and rear wheel speeds nF and nR, and to derive a reference torque-distribution command value T1 equivalent to a reference front-wheel driving torque distribution ratio based on the derived wheel speed difference ΔN. In addition, the microcomputer 70 also functions to derive a front-wheel side torque-distribution limiting value T$_{LIM}$ based on the vehicle speed indicative signal value V and the lateral acceleration indicative signal value Yg. As explained later, the front-wheel side torque-distribution limiting value T$_{LIM}$ is provided to suitably restrict a target torque-distribution command value T$_2$ which is equivalent to a target front-wheel side driving torque distribution ratio, in the event that the reference torque-distribution command value T$_1$ is rapidly decreased in response to a rapid change in the derived wheel speed difference $\Delta$N. The controller 58 operates to basically select the reference torque-distribution command value T$_1$ as the target torque-distribution command value T$_2$. However, the controller 58 operates to select the front-wheel side torque-distribution limiting value T$_{LIM}$ as the target torque-distribution command value T$_2$ as will be more fully described later with reference to the flowchart of FIG. 5, in the event that due to the decrease in the wheel speed difference $\Delta$N the previous reference command value T$_1$ (actually set to the target torque-distribution command value T$_2$) exceeds a current reference command value T$_1$ newly derived after calculation of the previous reference command value T$_1$. The target command value T$_2$ is output through the output interface 70d to the drive circuit 59 as the control signal S$_T$. The drive circuit 59 includes a floating type constant-voltage circuit, so as to convert the control signal S$_T$ indicative of the target command value T$_2$ to the command current I$_{SOL}$. The drive circuit 59 is so designed to set the command current value I$_{SOL}$ to zero in case of the target command value T$_2$=0 (corresponding to the front-and-rear wheel torque-distribution ratio of 0:100%), and set to a predetermined maximum current value in case of the target command value T$_2$=50 (corresponding to the front-and-rear wheel torque-distribution ratio of 50%:50%). Among T$_2$=0 and T$_2$=50, the drive circuit 59 is designed to linearly convert the target torque-distribution command value T$_2$ to the solenoid command value I$_{SOL}$ with a predetermined proportional gain m. Thus, the relation between the target torque-distribution command value T$_2$ and the command value I$_{SOL}$ can be indicated by an equation I$_{SOL}$=mT$_2$.

Figure 4:
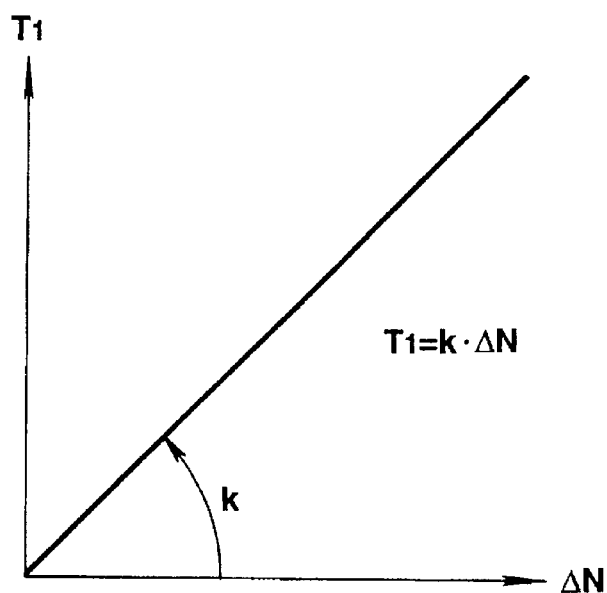
FIG. 4 is a correlative graph illustrating a relation between a wheel speed difference $\Delta N$ and a reference command torque value $T_1$ of the front wheel side in the system of FIG. 2.

In the exemplified front-engine, rear-wheel drive base mode four-wheel drive vehicles, the control procedure executed by the controller 58 of the embodiment is based on the assumption that only when the vehicle experiences the rear-wheel slip, a driving torque distribution control is executed by the controller so that the front-wheel side driving-torque component $\Delta$T is increased depending on a degree of slippage, i.e., the wheel speed difference $\Delta$N (=nR−nF), and when the vehicle experiences the front-wheel slip, the driving torque distribution control is not executed so that the driving-torque distribution ratio between front and rear wheels is not changed. As previously explained, the command current I$_{SOL}$ applied to the solenoid 50 is determined in response to the target torque-distribution command value T$_2$ produced by the microcomputer 70 in accordance with the equation I$_{SOL}$=mT$_2$. As seen in FIG. 3, the torque component $\Delta$T which is delivered to the front wheels (auxiliary wheels), can be adjusted in proportion to the command current value I$_{SOL}$, and thus the driving-torque distribution can be achieved depending on the torque-distribution command value T$_2$. The target torque-distribution command value T$_2$ (control signal S$_T$) which is actually output from the microcomputer 70 to the drive circuit 59, is usually set to the reference torque-distribution command value T$_1$. As seen in FIG. 4, the reference torque-distribution command value T$_1$ is determined on the basis of the wheel speed difference $\Delta$N, irrespective of the vehicle driving conditions, namely during acceleration, during deceleration, or during constant-speed driving. Thus, the reference torque-distribution command value T$_1$ is represented by an equation T$_1$=k$\Delta$N, where k is a proportional gain or a proportional coefficient. Note that the torque distribution control system of the invention utilizes the front-wheel side torque distribution limiting value T$_{LIM}$ as well as the reference torque-distribution command value T$_1$. The necessity of the torque distribution limiting value T$_{LIM}$ is hereinafter explained in detail.

For instance, when the clutch is disengaged, the derived wheel speed difference $\Delta$N is rapidly decreased towards zero. Except for particular conditions, for example during high-speed cornering wherein the inside wheels are apart from the road surface, in case of two different outside diameters at front and rear tires, or during unilateral slipping at either one of right and left wheels, the wheel speed difference $\Delta$N will reach finally to zero. As soon as the clutch is engaged again, the wheel speed difference $\Delta$N will be increased rapidly. In this case, there is no problem if the target torque-distribution command value T$_2$ is decreased and increased at real-time in accordance with the changes in the wheel speed difference $\Delta$N. However, there are a delay of response time in the control system and a delay of mechanical transmission in the clutch mechanism 37, as previously described. Even if the actual wheel speed difference has already been increased rapidly, there is the tendency of greatly decreased target torque-distribution command value T$_2$ which has been derived according to the previous control routine of the controller 58. Thus, there is a great mismatch between the front-wheel side driving torque component $\Delta$T based on the undesirably decreased target torque-distribution command value T$_2$ and a satisfactory front-wheel side driving torque component necessary to properly reduce the rapidly increased wheel speed difference. This mismatch tends to cause the rear wheel to slip when rapidly changing from shifting operation to accelerating operation, because the torque distribution ratio is kept substantially at 0:100% owing to the delay of response time. Under this condition, the controller 58 subsequently outputs the target torque-distribution command value T$_2$ based on the greatly increased wheel speed difference resulting from the rear-wheel slip (acceleration slip), so that the wheel speed difference is adjusted to an optimal wheel speed difference $\Delta$N* which is determined depending on a vehicle velocity or an acceleration exerted on the vehicle body. The target torque-distribution command value T$_2$ remains unchanged until the engaging operation of the clutch mechanism 37 is finished. For such a period of time (corresponding to a slip-loss time), the actual wheel speed difference between front and rear wheels has been greatly overshot the optimal wheel speed difference $\Delta$N*. Supposing that a slip loss is equivalent to the actual wheel speed difference overshooting the optimal wheel speed difference, the integral (energy loss) of slip losses accumulated for the above-mentioned slip-loss time tends to be greatly increased, since the rate of change in actual wheel speed difference is very great owing to the great slippage (acceleration slip) at rear wheels. Under the above-noted particular condition wherein a driving torque delivery to each wheel is momentarily stopped, for example when the clutch is disengaged for a relatively short time interval or during shifting operation, and thus the wheel speed difference has been decreased rapidly and thereafter increased rapidly, the front-wheel side torque-distribution limiting value T$_{LIM}$ is required to prevent occurrence of acceleration slip at the rear drive wheels 2RL and 2RR owing to a rapidly increased wheel speed difference resulting from transition from shifting operation to accelerating operation. That is, the front-wheel side torque-distribution limiting value T$_{LIM}$ is important to suppress a rapid increase in the rear wheel speed and to reduce the change rate (gradient) of the actual wheel speed difference. Concretely, when a current reference torque-distribution command value T$_1$ becomes below the previously derived target torque-distribution command value T$_2$ owing to the decrease in the derived wheel speed difference ΔN and the current reference torque-distribution command value T$_1$ is below the front-wheel side torque-distribution limiting value T$_{LIM}$, the controller 58 sets the target torque-distribution command value T$_2$ to the limiting value T$_{LIM}$ for a predetermined period of time t$_s$, with the result that a portion of driving torque is transferred to the front wheels (auxiliary wheels) 2FL and 2FR and thus the wheel speed difference is reduced towards the optimal wheel speed difference ΔN*. The limiting value T$_{LIM}$ is based on the detected vehicle speed V and lateral acceleration Yg. As is generally known, in case that a lateral acceleration exerted on the vehicle is increased during turning, a yawing moment tends to be increased. For the purpose that a locus of the vehicle is identical to an acceptable turning line against the increased yawing moment, theoretically, it is desirable that the driving torque delivered to the front wheels becomes equivalent to the driving torque delivered to the rear wheels irrespective of a rear-wheel drive or a front-wheel drive, so that the drivability is enhanced. Supposing that the driving torque distribution is quickly shifted to uniform torque distribution (the distribution ratio of 50%:50%) upon detecting the lateral acceleration Yg, the vehicle occupants feel uncomfortable due to a rapid change in steering characteristics. Thus, in consideration of the detected lateral acceleration Yg, it is advantageous to set a lateral-acceleration dependent torque-distribution limiting value T$_{LIM1}$ which is obtained by multiplying the detected lateral acceleration Yg by a predetermined small proportional coefficient K$_1$. On the other hand, in case that a running resistance is increased according to an increase in the vehicle speed V, a required traction must be increased so as to maintain a constant-speed driving state or an accelerating state. In this case, the wheel speed difference ΔN tends to be increased according to the increase in traction. Similarly, in consideration of the detected vehicle speed V, it is advantageous to set a vehicle-speed dependent torque-distribution limiting value T$_{LIM2}$ which is obtained by multiplying the detected vehicle speed V by a predetermined proportional coefficient K$_2$. The controller 58 derives the torque-distribution limiting value T$_{LIM}$ as the sum of the lateral-acceleration dependent torque-distribution limiting value T$_{LIM1}$ and the vehicle-speed dependent torque-distribution limiting value T$_{LIM2}$, as indicated by an equation T$_{LIM}$=T$_{LIM1}$+T$_{LIM2}$. In case that the controller selects the limiting value T$_{LIM}$ as the target torque-distribution command value T$_2$ during low-speed turning with great steering angle, the vehicle tends to experience tight-corner braking phenomenon owing to differential limiting action resulting from the limiting value T$_{LIM}$. In this case, there is the possibility that the vehicle stops undesirably or the engine stalls undesirably. To avoid such tight-corner braking phenomenon, a predetermined dead-band threshold V$_o$ is provided so that the vehicle-speed dependent torque-distribution limiting value T$_{LIM2}$ is set to zero when the detected vehicle speed V is below the predetermined dead-band threshold V$_o$. In case of the vehicle speed V above the dead-band threshold V$_o$, the vehicle-speed dependent torque-distribution limiting value T$_{LIM2}$ is linearly increased with the predetermined coefficient K$_2$ in proportion to the detected vehicle speed V. That is, T$_{LIM2}$ is represented by K$_2$(V−V$_o$) in case of V>V$_o$. T$_{LIM2}$ is set to zero in case of V≤V$_o$. Thus, the front-wheel side torque-distribution limiting value T$_{LIM}$ is generally indicated by the following equation.

$$T_{LIM}=K_1 Y_g+K_2(V-V_o)$$

In the above-indicated equation, a dead-band for the lateral-acceleration dependent torque-distribution limiting value T$_{LIM1}$ is neglected, because the detected lateral acceleration Yg and the detected vehicle speed V are correlated to each other and there is less tendency for the lateral acceleration to greatly develop in a particular vehicle-speed range below the above-noted dead-band threshold V$_o$ even if the steering angle is great. Thus, the dead-band for the lateral-acceleration dependent torque-distribution limiting value T$_{LIM1}$ is omitted from the above-indicated equation. Instead of calculation of the lateral-acceleration dependent torque-distribution limiting value T$_{LIM1}$ based on only the detected lateral acceleration Yg, a correction value of the detected lateral acceleration Yg may be utilized. For instance, the detected lateral acceleration Yg may be corrected in consideration of a turning radius which is derived on the basis of a wheel speed difference between front-left and front-right wheels and a wheel speed difference between rear-left and rear-right wheels, whereby the lateral-acceleration dependent torque-distribution limiting value T$_{LIM1}$ can be derived more accurately. Since the front-wheel side torque-distribution limiting value T$_{LIM}$ is designed as previously noted, the limiting value T$_{LIM}$ tends to become smaller than the reference torque-distribution command value T$_1$ during acceleration, and tends to become slightly greater than the reference torque-distribution command value T$_1$ during constant-speed driving and during deceleration. As appreciated, it is impossible to enhance a responsiveness of the torque distribution control, if the target torque-distribution command value T$_2$ is set to the limiting value T$_{LIM}$ after detection of the rapid increase subsequently to the rapid decrease in the wheel speed difference ΔN. Thus, in the system of the embodiment, upon the current reference torque-distribution command value T$_1$ reaches to a value below the previously derived target torque-distribution command value T$_2$, the limiting value T$_{LIM}$ is selected as the target torque-distribution command value T$_2$ for the predetermined period t$_s$. In the event that a current reference torque-distribution command value T$_1$ reaches to a value above the previous target torque-distribution command value T$_2$ or the current reference torque-distribution command value T$_1$ reaches to a value above the limiting value T$_{LIM}$, after the predetermined period t$_s$ has elapsed, the currently derived reference torque-distribution command value T$_1$ is selected as the target torque-distribution command value T$_2$. Thus, in the event that the vehicle experiences a rapid decrease in wheel speed difference between front and rear wheels, for example during transition from accelerating running to constant-speed running, the target torque-distribution command value T$_2$ can be quickly set to the front-wheel side torque-distribution limiting value T$_{LIM}$ but not to the reference torque-distribution command value T$_1$ for the predetermined period t$_s$. Thus, the system of the embodiment can satisfactorily prevent a rapid change of the torque distribution ratio toward the ratio of 0:100%, even in case of a rapid decrease in the wheel speed difference ΔN. Thereafter, as soon as the period t$_s$ has elapsed, a current reference torque-distribution command value T$_1$ is reset as the target torque-distribution command value T$_2$. As previously described, since the reference torque-distribution command value $T_1$ is designed to be slightly smaller than the limiting value $T_{LIM}$, with the target command value $T_2$ reset to the reference command value $T_1$, the drive mode is slightly shifted from the four-wheel drive tendencies to the rear-wheel drive tendencies, as compared with the limiting value $T_{LIM}$. Thus, fuel-consumption of the four-wheel drive vehicle can be enhanced generally. The control procedure executed by the microcomputer 70 of the controller 58 is hereinbelow described in detail in accordance with the flow chart of FIG. 5.

This control routine is executed as timer-triggered interrupt routines to be triggered every predetermined sampling time intervals $\Delta t_o$ (e.g. 10 msec). The previously-noted predetermined period $t_s$ is decided by the product ($n\Delta t_o$) of the predetermined time interval $\Delta t_o$ and the number or value $n$ counted by the timer. The elapsed time counted from the time when the actual torque-distribution command value $T_1$ has been updated by the front-wheel side torque-distribution limiting value $T_{LIM}$, is essentially identical to the product ($n\Delta t_o$). A preset maximum number $n_{MAX}$ of the timer is determined so that the predetermined period $t_s$ is equal to the product ($n_{MAX}\Delta t_o$) when the count number $n$ has reached to the maximum number $n_{MAX}$. In this manner, the target torque-distribution command value $T_2$ can be held at the limiting value $T_{LIM}$ for the predetermined period $t_s$ ($=n_{MAX}\Delta t_o$). The count number of the timer is memorized in the storage unit 70c.

In step S1, the front-wheel speed $nF$ detected by the sensor 54 and the rear-wheel speed $nR$ detected by the sensor 56 are read. In step S2, the vehicle speed V detected by the sensor 52 is read. In step S3, the lateral acceleration $Yg$ detected by the sensor 49 is read.

In step S4, the wheel speed difference $\Delta N$ between front and rear wheels is derived on the basis of the detected front and rear wheel speeds $nF$ and $nR$ in accordance with the equation ($\Delta N = nR - nF$).

In step S5, the reference torque-distribution command value $T_1$ is derived on the basis of the derived wheel speed difference $\Delta N$ in accordance with the equation ($T_1 = k\Delta N$).

In step S6, the front-wheel side torque-distribution limiting value $T_{LIM}$ is derived in accordance with the equation $\{T_{LIM} = K_1 Yg + K_2(V-V_o)\}$, utilizing the detected vehicle speed V and the detected lateral acceleration $Yg$.

In step S7, the target torque-distribution command value $T_2$ currently stored in the storage unit 70c is read.

In step S8, a test is made to determine whether the current reference torque-distribution command value $T_1$ derived in step S5 is greater than or equal to the target torque-distribution command value $T_2$ obtained through step S7. When the answer to step S8 is affirmative (YES), i.e., $T_1 \geq T_2$, the procedure enters step S9. In contrast, when the answer to step S8 is negative (NO), the procedure enters step S10.

In step S10, a test is made to determine whether the current reference torque-distribution command value $T_1$ derived in step S5 is greater than the front-wheel side torque-distribution limiting value $T_{LIM}$ obtained through step S6. When the answer to step S10 is affirmative (YES), i.e., $T_1 > T_{LIM}$, the procedure enters step S9. In contrast, when the answer to step S10 is negative (NO), the procedure enters step S11.

In step S11, the current count number $n$ stored in the storage unit 70c is read. Thereafter, step S12 proceeds in which a test is made to determine whether the count number $n$ is greater than or equal to the preset maximum number $n_{MAX}$. When the answer to step S12 is affirmative (YES), i.e., $n \geq n_{MAX}$, the procedure advances to step S9. When the answer to step S12 is negative, step S13 proceeds.

In step S9, the target torque-distribution command value $T_2$ currently stored in the storage unit 70c is set to the current reference torque-distribution command value $T_1$ derived in step S5. Thereafter, step S14 proceeds in which the count number $n$ of the timer is reset to zero. Next, the procedure enters step S15.

On the other hand, in step S13, the target torque-distribution command value $T_2$ currently stored in the storage unit 70c is set to the front-wheel side torque-distribution limiting value $T_{LIM}$ calculated through step S6. Then, the procedure shifts to step S16 in which the count number $n$ of the timer is increased by 1, that is, the count number $n$ is replaced by (n+1). Thereafter, the procedure flows to step S15.

In step S15, the target torque-distribution command value $T_2$ stored in the storage unit 70c is updated by the new target torque-distribution command value $T_2$ which is newly set by step S9 or S13. Next, step S17 proceeds in which the updated target torque-distribution command value $T_2$ is output to the drive circuit 59. In this manner, this control routine is repeatedly executed every predetermined time intervals $\Delta t_o$ (e.g. 10 msec).

Figure 5:
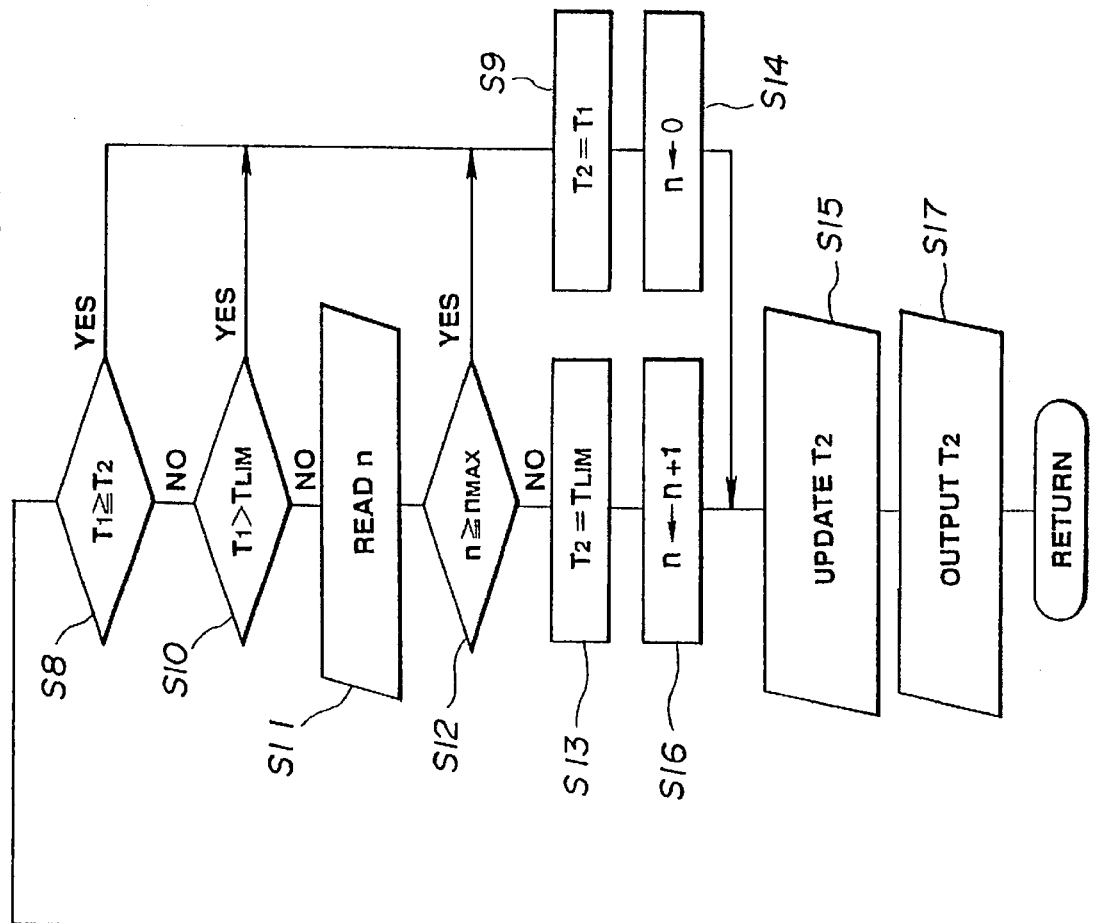
FIG. 5 is a How chart illustrating a control procedure executed by the system of FIG. 2.

As seen in FIG. 5, the procedure flows from one of steps S8, S10 and S12 through steps S9 and S14 to step S15, that is, the target torque-distribution command value $T_2$ is updated by the currently derived reference torque-distribution command value $T_1$ and additionally the timer is reset to zero, under a particular condition wherein the currently derived reference torque-distribution command value $T_1$ is greater than or equal to the previously set target torque-distribution command value $T_2$, or the currently derived torque-distribution command value $T_1$ is greater than the torque-distribution limiting value $T_{LIM}$, or the count number $n$ is greater than or equal to the predetermined maximum number $n_{MAX}$. The affirmative answer at step S8 means that the wheel speed difference $\Delta N$ tends to be gradually increased, because of the newly derived wheel-speed difference dependent reference torque-distribution command value $T_1$ above the previously output target torque-distribution command value $T_2$. For instance, in case of the usual straight-ahead accelerating state, the procedure may flow from step S8 to step S9. The affirmative answer at step S10 means that the wheel speed difference $\Delta N$ tends to be gradually increased and the lateral acceleration $Yg$ is relatively small, because of the newly derived wheel-speed difference dependent reference torque-distribution command value $T_1$ above the newly calculated lateral-acceleration dependent torque-distribution command value $T_{LIM}$. For instance, during acceleration on usual turns with a less lateral acceleration, the procedure may flow from step S10 to step S9. The affirmative answer at step S12 means that the count number $n$ of the timer has exceeded the maximum number $n_{MAX}$ after shifting from the accelerating state to the constant-speed driving state, that is, the running state of the vehicle has already shifted to the usual constant-speed running state after the predetermined elapsed time $t_s$ has been reached. On the other hand, under another condition wherein the currently derived reference torque-distribution command value $T_1$ is less than the previously set target torque-distribution command value $T_2$, and the currently derived torque-distribution command value $T_1$ is less than or equal to the torque-distribution limiting value $T_{LIM}$, and the count number $n$ is less than the predetermined maximum number $n_{MAX}$, the procedure flows from step S8 through steps S10, S11 and S12 to step S13 in which the target torque-distribution command value $T_2$ is updated by the front-wheel side torque-distribution limiting value $T_{LIM}$ calculated at step S6. The possibility of the flow from step S8 through steps S10, S11, S12, S13 and S16 to step S15 may occur when a shifting operation has been performed during acceleration, or when the elapsed time counted by the timer has not yet reached the predetermined period ts after shifting from the accelerating state to the constant-speed running state, or during deceleration, or during cornering with a great lateral acceleration exerted on the vehicle body.

In this manner, the target torque-distribution command value $T_2$ updated by the reference torque-distribution command value $T_1$ or the front-wheel side torque-distribution limiting value $T_{LIM}$, is output to the drive circuit 59 as the control signal $S_T$, so that the front-wheel side torque-distribution is adjusted to the target torque-distribution command value $T_2$.

The torque-distribution control executed by the control system of the invention is hereinbelow explained in detail in accordance with the time chart shown in FIG. 6, considering the actual behavior of the vehicle.

Figure 6:
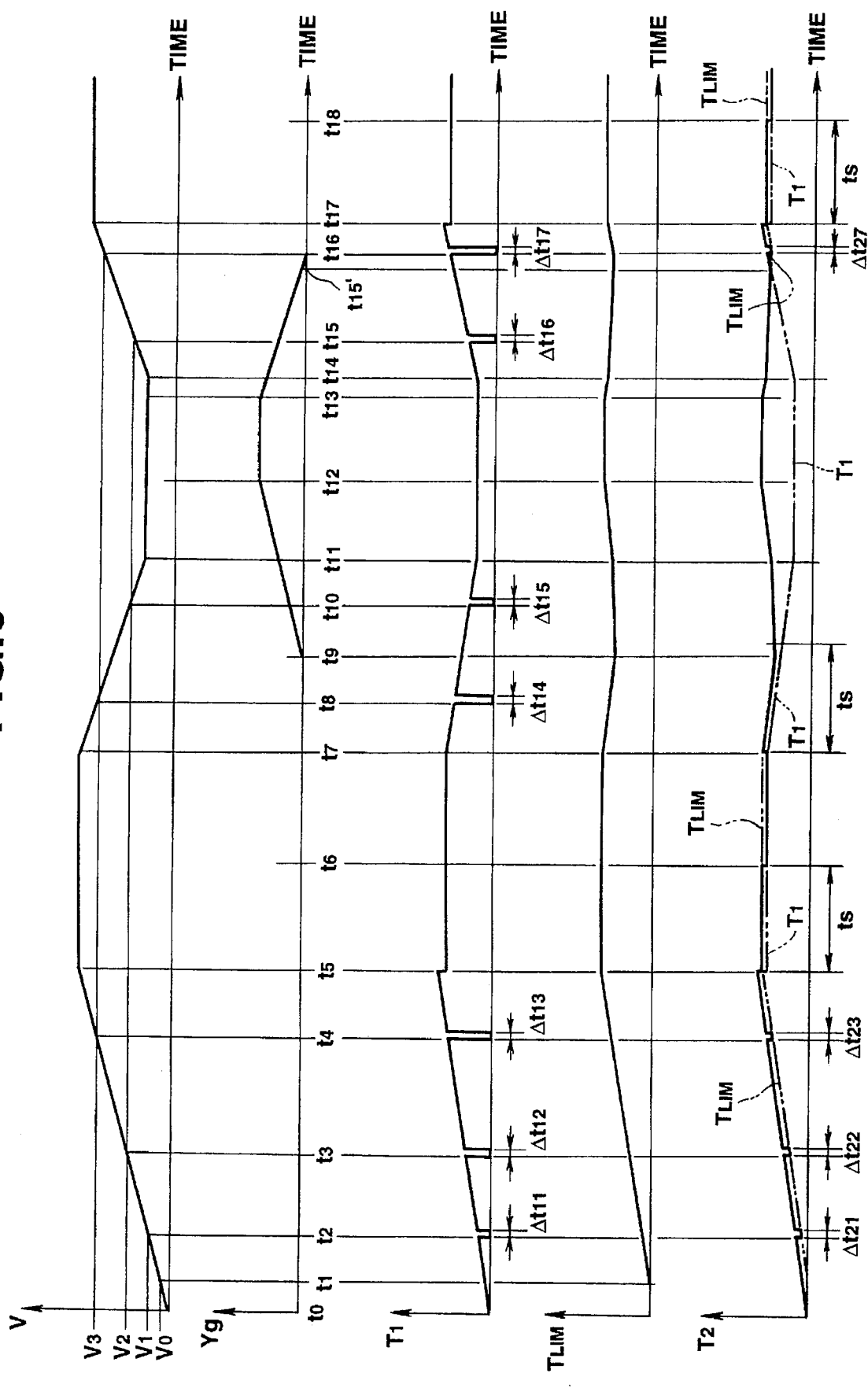
FIG. 6 is a time chart illustrating a relation between respective torque-distribution command values $T_1$ and $T_2$ and a torque-distribution limiting value $T_{LIM}$, based on the control procedure of FIG. 5.

In the time chart shown in FIG. 6, the vehicle starts to run at a time point t0. Until a time point t5, the vehicle is constantly accelerated in the straight-ahead running state. Between time points t5 and t7, the vehicle is conditioned in the straight-ahead running state at a constant speed. Between time points t7 and t11, the vehicle is constantly decelerated for the purpose of rounding a curve. Between time points t11 and t14, the vehicle conditioned in the constant-speed turning state. The vehicle is accelerated again with a positive acceleration from the time point t14, so as to escape from the curve. Just before a time point t9, the steering wheel is increasingly turned at a predetermined angular velocity corresponding to a predetermined incremental steering angle per unit hour. Just before a time point t12, the steering angle of the steering wheel is held constant. Just before a time point t13, the steering wheel is decreasingly turned at a predetermined angular velocity corresponding to a predetermined decremental steering angle per unit hour. Just before a time point t16, the steering wheel is held in its neutral position. Owing to the steering operation, the lateral acceleration exerted on the vehicle body develops with a second-order time-lag. Thus, the detected lateral acceleration $Y_g$ is increased at a predetermined increasing rate between the time points t9 and t12. Thereafter, the detected lateral acceleration $Y_g$ is kept constant until the time point t13. Then, the detected lateral acceleration $Y_g$ is decreased at a predetermined decreasing rate between the time points t13 and t16. On the other hand, after the accelerating state has been started at the time point t14, the accelerating state is continued until a time point t17. Just after the time point t17, the vehicle is conditioned again in the constant-speed straight-ahead driving state. In the embodiment, for the purpose of simplification of the disclosure, the respective shifting operations are based on the supposition that each shifting operation is performed at a predetermined vehicle speed. That is to say, the shifting operation from the first-speed gear (low gear) to the second-speed gear and vice versa is executed when the detected vehicle speed V is a predetermined speed $V_1$. The shifting operation from the second-speed gear to the third-speed gear and vice versa is executed when the detected vehicle speed V is a predetermined speed $V_2$. The shifting operation from the third-speed gear to the fourth-speed gear (high gear) and vice versa is executed when the detected vehicle speed V is a predetermined speed $V_3$. As seen in FIG. 6, the vehicle speed V detected between the time points t5 and t7 is preselected to be greater than the predetermined speed $V_3$, the vehicle speed V detected between the time points t11 and t14 is preselected to be smaller than the predetermined speed $V_2$, and the detected vehicle speed V detected after the time point 17 is preselected to be greater than the predetermined speed $V_3$. Thus, the shifting operation from the low gear to the second gear is executed just before the time point t2. Just before the time point t3, the shifting operation from the second gear to the third gear is executed. Just before the time point t4, the shifting operation from the third gear to the high gear is executed. Just before the time point t8, the shifting operation from the high gear to the third gear is executed. Just before the time point t10, the shifting operation from the third gear to the second gear is executed. Just before the time point t15, the shifting operation from the second speed to the third speed is executed. Just before the time point t16, the shifting operation from the third speed to the high speed is executed. A shifting time duration $\Delta t$ required to complete each shifting operation is preset constant, such that the clutch is disengaged just before the shifting time duration $\Delta t$ and engaged just after the shifting time duration $\Delta t$. The previously-noted constant-speed driving state is preset to be kept for a predetermined time interval greater than the predetermined time period ts. Actually, the detected vehicle speed V or the detected lateral acceleration $Y_g$ is not increased or decreased in a linear fashion. Also, when the clutch is disengaged during shifting, the vehicle speed V is not increased with a constant acceleration or not decreased with a constant deceleration, as seen in FIG. 6. During shifting, the vehicle speed V varies actually based on inertia of the vehicle. For the purpose of simplification of the disclosure, the torque-distribution characteristics illustrated in the time chart of FIG. 6 is based on the supposition that the detected vehicle speed V is varied with a constant acceleration or deceleration even during shifting and the detected lateral acceleration $Y_g$ are linearly varied. The torque-distribution characteristics of the time chart of FIG. 6 is also based on the assumption that a road surface condition is a flat and high-μ road surface condition, such as dry pavements, and a driving torque to be consumed during constant-speed driving, during acceleration, and during deceleration, is varied depending on the detected vehicle speed V. Additionally, as appreciated from comparison between the change rate in the reference torque-distribution command value $T_1$ and the change rate in the torque-distribution limiting value $T_{LIM}$ illustrated in the time chart of FIG. 6, the proportional coefficient k necessary to derive the command value $T_1$ is set to be equivalent to the proportional coefficient $K_2$ related to the vehicle-speed dependent torque-distribution limiting value $T_{LIM2}$.

As seen in the time chart of FIG. 6, the detected vehicle speed V is gradually increased with a constant acceleration between the time points t0 and t5, and thus the driving torque is also increased in accordance with the increase in the vehicle speed V. Under this condition, the wheel speed difference $\Delta N$ derived through step S4 is increased except for during up-shift at the respective time points t2, t3 and t4, with the result that the reference torque-distribution command value $T_1$ is gradually increased except for the respective time durations $\Delta t11$, $\Delta t12$ and $\Delta t13$. Since the clutch is disengaged during up-shift at each time point t2, t3 and t4 and the running state is temporarily shifted from the accelerating state to the coasting state, the wheel speed difference $\Delta N$ becomes substantially zero for each time duration $\Delta t11$, $\Delta t12$ and $\Delta t13$ and then the front-wheel side reference torque-distribution command value $T_1$ based on the difference $\Delta N$ is set to substantially zero. Since the respective time durations $\Delta t11$, $\Delta t12$, and $\Delta t13$ are required to recover from a rapid drop in the reference torque-distribution command value $T_1$, such time durations $\Delta t1i$ ($\Delta t11$, $\Delta t12$, $\Delta t13$, ..., $\Delta t17$) will be hereinafter referred to as a "front-wheel side reference torque-distribution command value recovery time duration". On the other hand, the front-wheel side torque-distribution limiting value $T_{LIM}$ is set to zero between the time points $t0$ and $t1$, because this zone corresponds to the dead-band of the vehicle-speed dependent torque-distribution limiting value $T_{LIM2}$ and additionally the lateral acceleration $Y_g$ is zero within this zone. The torque-distribution limiting value $T_{LIM}$ is equal to the vehicle-speed dependent torque-distribution limiting value $T_{LIM1}$ between the time points $t1$ and $t5$, because of the lateral-acceleration dependent torque-distribution limiting value $T_{LIM2}$ of 0. As set forth above, since the proportional coefficients $k$ and $K_2$ are set to be equal to each other, the up-gradient of the torque-distribution limiting value $T_{LIM}$ is equal to that of the reference torque-distribution command value $T_1$ within this zone from the point $t1$ to the point $t5$. During acceleration between the time points $t1$ and $t5$, the torque-distribution limiting value $T_{LIM}$ is set to be slightly less than the reference torque-distribution command value $T_1$, except for the front-wheel side reference torque-distribution command value recovery time durations $\Delta t11$, $\Delta t12$, and $\Delta t13$. As appreciated from the algorithm shown in FIG. 5, the reference torque-distribution command value recovery time durations $\Delta t11$, $\Delta t12$, and $\Delta t13$ resultingly cause respective recovery time durations $\Delta t21$, $\Delta t22$, and $\Delta t23$ in the front-wheel side target torque-distribution command value $T_2$. Such time durations $\Delta t2i$ ($\Delta t21$, $\Delta t22$, $\Delta t23$, and $\Delta t27$) will be hereinafter referred to as a "front-wheel side target torque-distribution command value recovery time duration". Thus, between the time points $t0$ and $t5$ except the time durations $\Delta t21$, $\Delta t22$, and $\Delta t23$, the reference torque-distribution command value $T_1$ is slightly greater than the torque-distribution limiting value $T_{LIM}$ and in addition the newly derived reference torque-distribution command value $T_1$ is greater than the previously output target torque-distribution command value $T_2$, with the result that the procedure flows from step S8 to step S9 in which the newly derived reference torque-distribution command value $T_1$ is selected as the target torque-distribution command value $T_2$. Thereafter, in step S14, the count number of the timer is reset to zero, and in step S16 the target torque-distribution command value $T_2$ is updated by the newly derived reference torque-distribution command value $T_1$, and finally the updated target torque-distribution command value $T_2$ is output as the control signal $S_T$ in step S16. On the other hand, for the front-wheel side target torque-distribution command value recovery time durations $\Delta t21$, $\Delta t22$, and $\Delta t23$, the reference torque-distribution command value $T_1$ rapidly drops down to zero owing to the wheel speed difference $\Delta N$ of approximately zero. Therefore, for the time durations $\Delta t21$, $\Delta t22$, and $\Delta t23$, the torque-distribution limiting value $T_{LIM}$ derived in step S6 exceeds the reference torque-distribution command value $T_1$ derived in step S5, with the result that the procedure flows from step S8 through steps S11 and S12 to step S12. Since the required shifting time $\Delta t$ or the respective front-wheel side torque-distribution command value recovery time duration $\Delta t21$, $\Delta t22$, and $\Delta t23$ is considerably shorter than the predetermined period $t_s$ (corresponding to the preset maximum count number $n_{MAX}$ of the timer), the count number $n$ of the timer does not reach to the maximum number $n_{MAX}$ for each time duration $\Delta t21$, $\Delta t22$, and $\Delta t23$. In this case, the procedure flows from step S12 through steps S13 and S16 to step S15, and consequently to step S16 in which the target torque-distribution command value $T_2$ updated by the torque-distribution limiting value $T_{LIM}$ is output as the control signal $S_T$. In this manner, during shifting operations between the time points $t0$ and $t5$, the front-wheel side target torque-distribution command value $T_2$ can be set to be slightly smaller torque distribution by way of replacement with the torque-distribution limiting value $T_{LIM}$, as compared with the reference torque-distribution command value $T_1$.

Between the time points $t5$ and $t7$ (during constant-speed driving), the detected vehicle speed $V$ is maintained essentially constant. Owing to running resistance not including acceleration resistance, the required driving torque during the constant-speed driving is smaller than that during acceleration. As a result, the wheel speed difference $\Delta N$ within a zone defined between the time points $t5$ and $t7$ is slightly smaller value than the wheel speed difference $\Delta N$ derived just before the time point $t5$ at which once the accelerating state terminates. Thus, the wheel speed difference $\Delta N$ rapidly slightly drops just after the time point $t5$ and kept constant until the time point $t7$, with the result that the reference torque-distribution command value $T_1$ also varies in the same manner as the change in the wheel speed difference $\Delta N$. On the assumption that the shifting operation is not performed during constant-speed driving, the reference torque-distribution command value $T_1$ does not fluctuate within the zone of $t5$ to $t7$. Since between the time points $t5$ and $t7$ the detected lateral acceleration $Y_g$ is zero and the detected vehicle speed $V$ is maintained at the vehicle speed detected at the time point $t5$, the torque-distribution limiting value $T_{LIM}$ is held at the same vehicle-speed dependent torque-distribution limiting value $T_{LIM1}$ as calculated at the time point $t5$. Between the time points $t5$ and $t7$, since the detected vehicle speed $V$ is reached substantially to a peak value, the torque-distribution limiting value $T_{LIM}$ derived at step S6 exceeds the reference torque-distribution command value $T_1$ derived at step S5. Across the time point $t5$, the reference torque-distribution command value $T_1$ is less than the previously output target torque-distribution command value $T_2$, and also less than the torque-distribution limiting value $T_{LIM}$. Thus, the control procedure flows from step S8 through steps S10, S11, S12, S13, S16 and S15 to step S17, with the result that the torque-distribution limiting value $T_{LIM}$ is set to the target torque-distribution command value $T_2$, until the predetermined period $t_s$ has elapsed, that is, between the time points $t5$ and $t6$. Since the count number $n$ of the timer has reached to the maximum count number $n_{MAX}$ at the time point $t6$, the procedure shifts from step 12 to step S9 just after the time point $t6$, and then the reference torque-distribution command value $T_1$ is set to the target torque-distribution command value $T_2$. For the time interval defined from just after the time point $t6$ to the time point $t7$, the reference torque-distribution command value $T_1$ is equal to the target torque-distribution command value $T_2$, since the reference command value $T_1$ has been already set to the target command value $T_2$. The control procedure flows from step S8 to step S9. Thus, the target command value $T_2$ between the time points $t6$ and $t7$ is kept at a slightly lower level than that between the time points $t5$ and $t6$.

Between the time points $t7$ and $t11$, when the running state is shifted from the constant-speed driving state to the deceleration-turning state, the detected vehicle speed $V$ is gradually decreased with a predetermined deceleration. Thus, the driving torque is also decreased in accordance with the decrease in the vehicle speed $V$. Under this condition, the wheel speed difference $\Delta N$ is decreased except for during down-shift at the respective time points $t8$ and $t10$, with the result that the reference torque-distribution command value $T_1$ is gradually decreased except for the front-wheel side reference torque-distribution command value recovery time duration $\Delta t_{14}$ during down-shift from the high gear to the third gear and the front-wheel side reference torque-distribution command value recovery time duration $\Delta t_{15}$ during down-shift from the third gear to the second gear. Since the clutch is disengaged during down-shift at each time point $t_8$ and $t_{10}$ and the running state is temporarily shifted from the decelerating state to the coasting state, the wheel speed difference $\Delta N$ becomes substantially zero for each time duration $\Delta t_{14}$ and $\Delta t_{15}$ and thus the front-wheel side reference torque-distribution command value $T_1$ rapidly drops down to substantially zero for each time duration $\Delta t_{14}$ and $\Delta t_{15}$. On the other hand, the detected lateral acceleration $Y_g$ starts to increase in a linear fashion from the time point $t_9$ substantially midway between the time points $t_7$ and $t_{11}$. Between the time points $t_7$ and $t_9$ without any lateral acceleration, the front-wheel side torque-distribution limiting value $T_{LIM}$ is decreased in proportion to only the detected vehicle speed V having the constant deceleration owing to the lateral-acceleration dependent torque-distribution limiting value $T_{LIM2}$ of 0. In addition, during deceleration between the time points $t_7$ and $t_9$, the torque-distribution limiting value $T_{LIM}$ is set to be slightly greater than the reference torque-distribution command value $T_1$, except for the front-wheel side reference torque-distribution command value recovery time durations $\Delta t_{14}$ and $\Delta t_{15}$. On the other hand, during deceleration-turning with the detected lateral acceleration $Y_g$ having a constant increasing rate between the time points $t_9$ and $t_{11}$, the gradient of the torque-distribution limiting value $T_{LIM}$ is gentle owing to the newly added lateral-acceleration dependent torque-distribution limiting value $T_{LIM2}$, as compared with the down-gradient of the torque-distribution limiting value $T_{LIM}$ between the time points $t_7$ and $t_9$. Thus, between the time points $t_7$ and $t_{11}$, the torque-distribution limiting value $T_{LIM}$ constantly exceeds the reference torque-distribution command value $T_1$, and in addition the newly derived reference torque-distribution command value $T_1$ is less than the previously output target torque-distribution command value $T_2$, with the result that the procedure flows from step S8 through steps S10, S11 and S12 to step S13 in which the newly calculated torque-distribution limiting value $T_{LIM}$ is set to the target torque-distribution command value $T_2$, until the predetermined period $t_s$ has elapsed. However, since the reference torque-distribution command value $T_1$ is constantly maintained less than the previously output target torque-distribution command value $T_2$ between the time points $t_7$ and $t_{11}$ even when the predetermined period $t_s$ has elapsed, the procedure returns again to the flow from step S8 through steps S10, S11, S12 and S13 to step S16 after the flow from step S12 through step S9 to step S14 just after the elapsed time period $t_s$. Resultingly, between the time points $t_7$ and $t_{11}$, the torque-distribution limiting value $T_{LIM}$ is selected as the target torque-distribution command value $T_2$.

Between the time points $t_{11}$ and $t_{14}$, during transition from the deceleration-turning state to the constant-speed turning state, the detected vehicle speed V is maintained constant at the speed detected at the time point $t_{11}$, and thus the driving torque is kept constant. The wheel speed difference $\Delta N$ is also kept constant in proportion to the detected vehicle speed V, with the result that the reference torque-distribution command value $T_1$ is kept at the reference torque-distribution command value derived at the time point $t_{11}$. The reference torque-distribution command value $T_1$ does not fluctuate between the time points $t_{11}$ and $t_{14}$ on the assumption that there is no shifting operation during the constant-speed turning. On the other hand, the detected lateral acceleration $Y_g$ is increased with a constant increasing rate between the time points $t_{11}$ and $t_{12}$, and held constant between the time points $t_{12}$ and $t_{13}$, and decreased with a constant decreasing rate between the time points $t_{13}$ and $t_{14}$. Between the time points $t_{11}$ and $t_{12}$ with the up-gradient of the detected lateral acceleration $Y_g$, the torque-distribution limiting value $T_{LIM}$ has an up-gradient owing to the torque-distribution component based on the lateral-acceleration dependent torque-distribution limiting value $T_{LIM2}$ as well as the vehicle-speed dependent torque-distribution limiting value $T_{LIM1}$. Between the time points $t_{12}$ and $t_{13}$ with the constant lateral acceleration $Y_g$, the torque-distribution limiting value $T_{LIM}$ is maintained at the limiting value $T_{LIM}$ derived at the time point $t_{12}$. Between the time points $t_{13}$ and $t_{14}$ with the down-gradient of the detected lateral acceleration $Y_g$, the torque-distribution limiting value $T_{LIM}$ has a down-gradient owing to the lateral-acceleration dependent torque-distribution limiting value $T_{LIM2}$ having the down-gradient. Thus, between the time points $t_{11}$ and $t_{14}$, the torque-distribution limiting value $T_{LIM}$ is maintained greater than the reference torque-distribution command value $T_1$ owing to the lateral-acceleration dependent torque-distribution limiting value $T_{LIM2}$. Since the torque-distribution limiting value $T_{LIM}$ has been selected as the target torque-distribution command value $T_2$ at the time point $t_{11}$ and additionally the previous target torque-distribution command value $T_2$ exceeds the newly or currently derived reference torque-distribution command value $T_1$ between the time points $t_{11}$ and $t_{14}$, the procedure flows from step S8 through steps S10, S11, S12 to step S13 in which the torque-distribution limiting value $T_{LIM}$ is set to the target torque-distribution command value $T_2$. Resultingly, the control procedure between the time points $t_{11}$ and $t_{14}$ is executed in the same manner as the procedure between the time points $t_7$ and $t_{11}$.

Between the time points $t_{14}$ and $t_{17}$, during transition from the constant-speed turning state to the accelerating state, the detected vehicle speed V is gradually increased with a constant acceleration, and thus the driving torque is increased in proportion to the increase in the vehicle speed V. As a result, the wheel speed difference $\Delta N$ is increased except for during up-shift at the respective time points $t_{15}$ and $t_{16}$, with the result that the reference torque-distribution command value $T_1$ is gradually increased in proportion to the increase in the vehicle speed V, except for the respective time durations $\Delta t_{16}$ and $\Delta t_{17}$. Since the clutch is disengaged during up-shift at each time point $t_{15}$ and $t_{16}$ and the running state is temporarily shifted from the accelerating state to the coasting state, the wheel speed difference $\Delta N$ becomes substantially zero for each time duration $\Delta t_{16}$ and $\Delta t_{17}$ and then the reference torque-distribution command value $T_1$ is set to substantially zero. On the other hand, during acceleration with the detected lateral acceleration $Y_g$ (having the same down-gradient as between the time points $t_{13}$ and $t_{14}$) between the time points $t_{14}$ and $t_{16}$, the gradient of the torque-distribution limiting value $T_{LIM}$ is gentle owing to cancellation between the up-gradient of the vehicle-speed dependent torque-distribution limiting value $T_{LIM1}$ and the down-gradient of the lateral-acceleration dependent torque-distribution limiting value $T_{LIM2}$, as compared with the down-gradient of the torque-distribution limiting value $T_{LIM}$ between the time points $t_{13}$ and $t_{14}$. A character $t_{15}'$ denotes a particular time point at which the gradually increasing reference torque-distribution command value $T_1$ becomes equal to the torque-distribution limiting value T$_{LIM}$. Between the time points t16 and t17, the torque-distribution limiting value T$_{LIM}$ is equal to the vehicle-speed dependent torque-distribution limiting value T$_{LIM1}$ because of the lateral-acceleration dependent torque-distribution limiting value T$_{LIM2}$ of 0. Thus, the torque-distribution limiting value T$_{LIM}$ is greater than the reference torque-distribution command value T1 between the time points t14 and t15'. Between the time points t15' and t16, the torque-distribution limiting value T$_{LIM}$ is less than the reference torque-distribution command value T1. At the time point t16, the constant-speed turning state terminates with the detected lateral acceleration Yg of 0 and the accelerating state starts. Between the time points t16 and t17, the torque-distribution limiting value T$_{LIM}$ is less than the reference torque-distribution command value T1 except for the front-wheel side reference torque-distribution command value recovery time duration Δt17, and additionally the torque-distribution limiting value T$_{LIM}$ is so designed to be slightly smaller than the reference torque-distribution command value T1 during acceleration. For the time duration Δt17, the torque-distribution limiting value T$_{LIM}$ is greater than the reference torque-distribution command value T1. Since the torque-distribution limiting value T$_{LIM}$ has been selected as the target torque-distribution command value T2 at the time point t14 and additionally the previous target torque-distribution command value T2 exceeds the newly derived reference torque-distribution command value T1 between the time points t14 and t15', the procedure flows from step S8 through steps S10, S11, S12 to step S13 in which the torque-distribution limiting value T$_{LIM}$ is set to the target torque-distribution command value T2. Just after the time point t15', since the newly derived reference torque-distribution command value T1 exceeds the torque-distribution limiting value T$_{LIM}$, the procedure flows from step S10 to step S9 in which the reference torque-distribution command value T1 is set to the target torque-distribution command value T2. Similarly, between the time points t15' and t17, since the reference torque-distribution command value T1 exceeds the torque-distribution limiting value T$_{LIM}$ except for the time duration Δt17, the procedure flows through step S9 to steps S15 and S17. On the other hand, for the front-wheel side torque-distribution command value recovery time duration Δt27, since the newly derived reference torque-distribution command value T1 is less than the previous target torque-distribution command value T2 owing to the a rapid drop in the wheel speed difference ΔN, the procedure flows from step S8 through steps 10, S11, S12, S13, S16 and S15 to step S17, so that the torque-distribution limiting value T$_{LIM}$ is selected as the target torque-distribution command value T2.

When shifted from the accelerating state to the constant-speed straight-ahead driving state after the time point t17, the detected vehicle speed V is maintained constant. The procedure executed after the time point t17 is similar to the procedure executed between the time points t5 and t7. Owing to the running resistance not including the acceleration resistance, the required driving torque after the time point t17 is slightly smaller than that just before the time point t17. Thus, during constant-speed driving after the time point t17, the torque-distribution limiting value T$_{LIM}$ exceeds the reference torque-distribution command value T1. Just after the time point t17, the newly derived reference torque-distribution command value T1 is less than the previous torque-distribution limiting value T2. Thus, the control procedure flows from step S8 through steps S10, S11, S12, S13, S16 and S15 to step S17 in that order, with the result that the torque-distribution limiting value T$_{LIM}$ is set to the target torque-distribution command value T2, until the predetermined period ts has elapsed, that is, between the time points t17 and t18. Since the count number n of the timer has reached to the maximum count number nMAX at the time point t18, the procedure shifts from step 12 to step S9 just after the time point t18, and then the reference torque-distribution command value T1 is set to the target torque-distribution command value T2. Just after the time point t18, the reference torque-distribution command value T1 is equal to the target torque-distribution command value T2, since the reference command value T1 has been already set to the target command value T2. The control procedure flows from step S8 to step S9. Thus, after the time point t18, the target command value T2 is kept at a slightly lower level than that between the time points t17 and t18.

As explained according to the time chart shown in FIG. 6, the target torque-distribution command value T2 is suitably selected from the reference torque-distribution command value T1 and the torque-distribution limiting value T$_{LIM}$. Even in case of a rapid drop in the reference torque-distribution command value T1 occurring due to shifting operation, the actually generated target torque-distribution command value T2 can be kept at the torque-distribution limiting value T$_{LIM}$. Therefore, the torque-distribution control system of the present invention can prevent undesirable acceleration slip which would occur owing to a rapid drop in the front-wheel side torque-distribution resulting from shifting operation during acceleration. As a result, loss of traction can be reduced to a minimum, thereby improving fuel consumption. During deceleration and during turning, since the torque distribution ratio between front and rear wheels can be suitably corrected by the front-wheel side torque-distribution limiting value, the running stability of the vehicle is enhanced. In particular, during turning, since the front-wheel side target torque distribution T2 is determined in consideration of the magnitude of the detected lateral acceleration Yg as well as the detected vehicle speed V, the running stability can be remarkably improved.

In case that, during the accelerating driving or constant-speed driving, the road surface condition is changed from the high-μ road such as the dry pavements to the low-μ road such as wet, snow or icy roads, and consequently slip loss (loss of traction) of the rear wheels (main drive wheels) develops greatly, the wheel speed difference ΔN between the rear wheel speed (main drive wheel) nR and the front wheel speed (auxiliary drive wheel) nF on the low-μ roads increases rapidly, as compared with the high-μ roads. Thus, the reference torque-distribution command value T1 is temporarily increased in accordance with the rapid increase in the wheel speed difference ΔN, with the result that the procedure flows from step S8 or step S10 to step S9 in which the newly derived torque-distribution command value T1 is set to the target torque-distribution command value T2. In this case, the control signal ST generated from the output interface 70d temporarily rises and thus the torque distribution ratio between front and rear wheels is changed to the ratio of 50%:50% with the clutch engaging force rapidly increased, so that the loss of traction at the rear wheels is reduced quickly to the optimal slip rate and consequently the wheel speed difference ΔN is quickly adjusted to the optimal wheel speed difference ΔN*, thereby enhancing both an acceleration performance and a drivability. The previously-noted feedback control in the torque-distribution between front and rear wheels, is also executed when the vehicle starts on the low-μ road, so as to stabilize the behavior of the vehicle.

Figure 7:
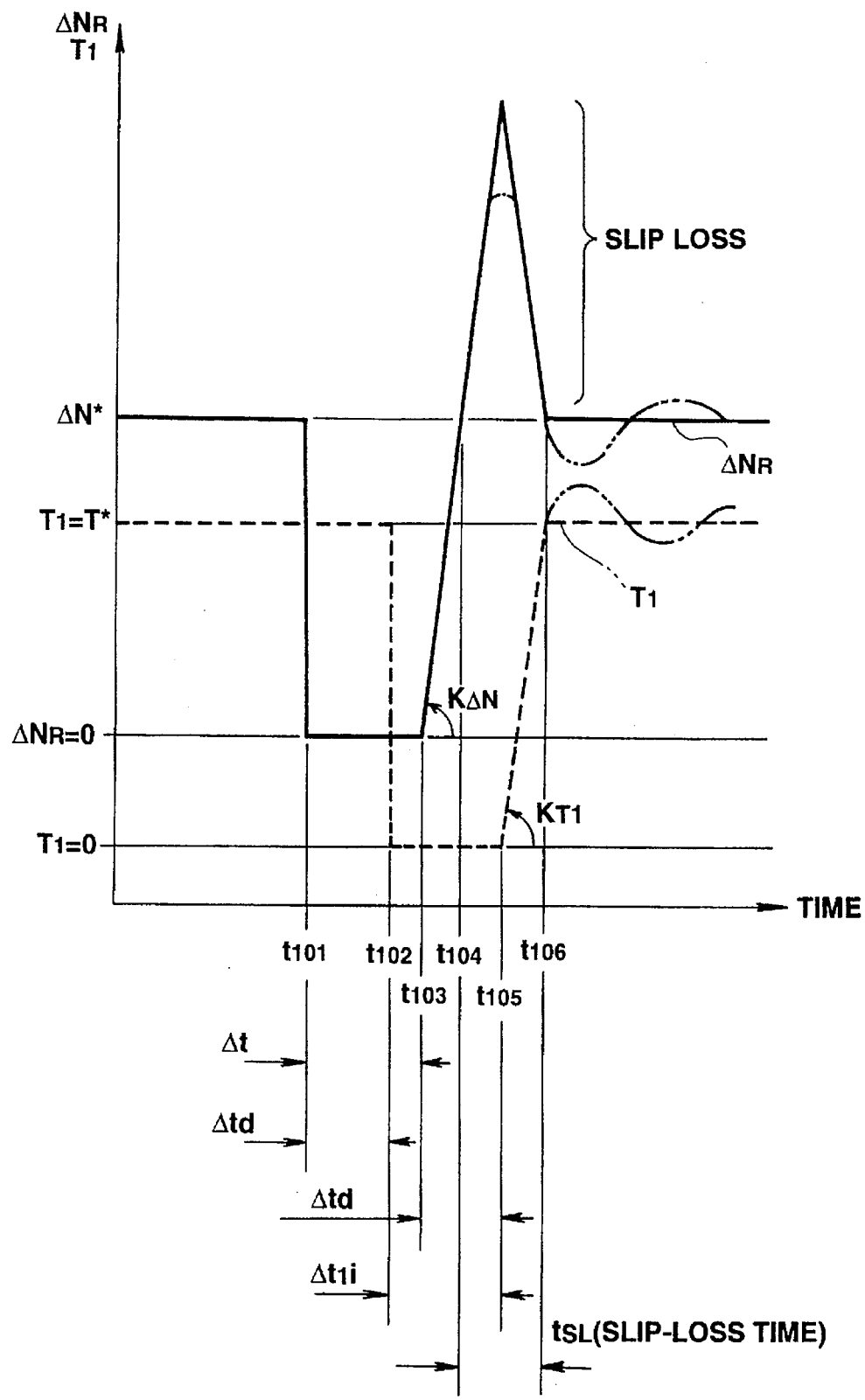
FIG. 7 is a time chart illustrating variations in the torque-distribution command value $T_1$ during shifting in the accelerating state in a conventional driving torque distribution system.
Figure 8:
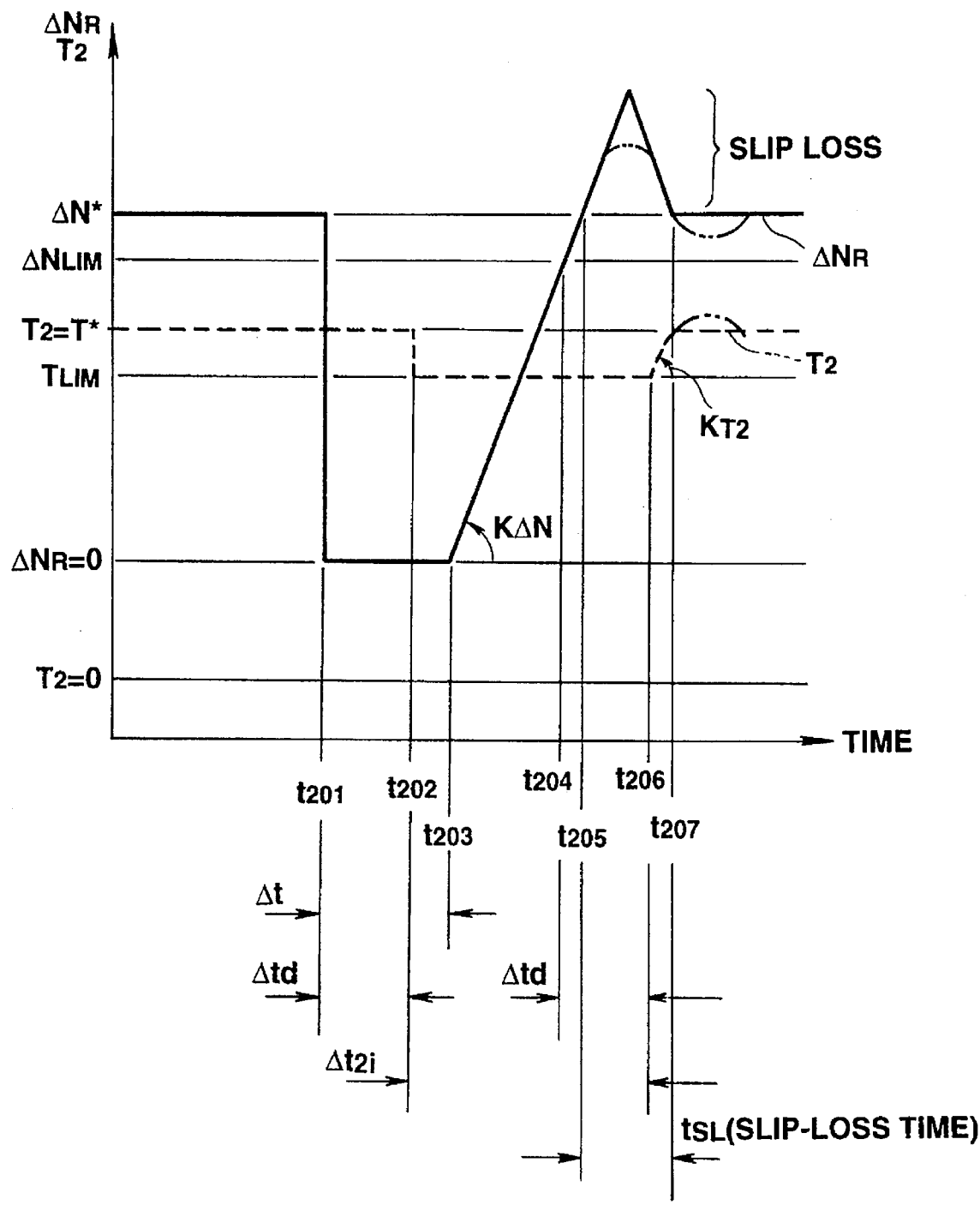
FIG. 8 is a time chart illustrating variations in the torque-distribution command value $T_2$ during shifting in the accelerating state in the system of the present invention.

For the purpose of comparison between the conventional torque-distribution control system and the improved torque-distribution control system of the present invention, in case that the delivery of driving torque to the front and rear wheels is stopped temporarily for a short time period owing to the shifting operation, the change in the torque-distribution command value T1 actually output from the conventional system and the change in the torque-distribution command value T2 actually output from the improved system of the present invention are highlighted in more detail by the time charts of FIGS. 7 and 8, respectively. FIG. 7 shows a relation between an actual wheel speed difference ΔNR between front and rear wheels and the reference torque-distribution command value T1 in the conventional system in which the front-wheel side reference torque-distribution command value T1 based on the detected wheel speed difference ΔN is permanently used as the actually output target torque-distribution command value. On the other hand, FIG. 8 shows a relation between the actual wheel speed difference ΔNR and the target torque-distribution command value T2 in the improved system in which the target torque-distribution command value T2 is selected from the front-wheel side reference torque-distribution command value T1 and the front-wheel side torque-distribution limiting value TLIM. The detailed wave-form of the reference torque-distribution command value T1 of FIG. 7 and the detailed wave-form of the actually output target torque-distribution command value T2 of FIG. 8 represents a rapid drop and rise in the actually output torque-distribution command value occurring during shifting in the accelerating state at the time points t2, t3 and t4 shown in FIG. 6, for example. In FIGS. 7 and 8, the character ΔN* denotes the optimal wheel speed difference, while the character T* denotes an optimal front-wheel side torque-distribution command value based on the optimal wheel speed difference ΔN*. The time charts illustrated in FIGS. 7 and 8 are based on the assumption that the optimal front-wheel side torque-distribution command value T* is designed to be slightly offset from the optimal wheel speed difference ΔN* at a lower level and these values ΔN* and T* are kept constant, although these values ΔN* and T* fluctuate actually depending on the running condition of the vehicle. Furthermore, the time charts of FIGS. 7 and 8 are based on the assumption as set forth below. A response-time delay Δtd necessary for termination of one cycle of the control routine shown in FIG. 5 terminates from the time when the actual wheel speed difference ΔNR has been detected, is a constant time duration. The up-gradient KT1 of the front-wheel side torque-distribution command value T1 or the up-gradient KT2 of the front-wheel side target torque-distribution command value T2 is essentially equivalent to the up-gradient KΔN of the actual wheel speed difference ΔN. In FIGS. 7 and 8, the solid line related to the actual wheel speed difference ΔNR represents a schematic hypothetical line of the actual wheel speed difference ΔNR, while the broken line related to the reference torque-distribution command value T1 represents a schematic hypothetical line of the reference torque-distribution command value T1. On the other hand, the upper and lower two-dotted lines respectively represent an actual wave-form of the actual wheel speed difference ΔNR and the actually output torque-distribution command value T1 (in FIG. 7) or T2 (in FIG. 8). The up-gradients KΔN and KT1 in FIG. 7 or the up-gradients KΔN and KT2 in FIG. 8 are simply indicated to vary in a linear fashion, although the actual wheel speed difference ΔNR and the actually output torque-distribution command value T1 (in FIG. 7) or T2 (in FIG. 8) are recovered or converged respectively to the optimal wheel speed difference ΔN* and the optimal torque-distribution command value T* in the form of a decay curve.

Referring now to FIG. 7, the actual wheel speed difference ΔNR rapidly drops down to zero with an infinite down-gradient at the time point t101, and rapidly rises up to the optimal wheel speed difference ΔN* with the up-gradient KΔN at the time point t103 after the shifting time duration Δt has elapsed. On the other hand, the front-wheel side reference torque-distribution command value T1 rapidly drops down to zero with an infinite down-gradient at the time point t102 with a predetermined response-time delay Δtd from the time point t101, and rapidly rises up to the optimal torque-distribution command value T* with the up-gradient KT1 at the time point t105 with the predetermined response-time delay Δtd from the time point t103. Based on the previously-noted assumption, the front-wheel side reference torque-distribution command value recovery time duration Δt1i (Δt11, Δt12, Δt13, . . . , Δt17) becomes equivalent to the shifting time duration Δt. In the conventional system, such a response-time delay causes excessive slippage (acceleration-slip) at the rear wheels (main drive wheels) for the reasons set forth below. That is, upon the clutch is engaged again at the time point t103 after the shifting time duration Δt has elapsed, the entire driving torque is delivered to the rear wheels 2RL and 2RR, since the control signal ST is output to the drive circuit 59 on the basis of the front-wheel side reference torque-distribution command value T1 which is still maintained at zero at the time point t103. Owing to the undesirably increased driving torque at the rear wheels, the actual wheel speed difference ΔNR rapidly increases with the up-gradient KΔN at the time point t103 and thus overshoots the optimal wheel speed difference ΔN* at the time point t104. The up-gradient KΔN of the actual wheel speed difference ΔNR causes the reference torque-distribution command value T1 to increase with the up-gradient KT1 at the time point t105 after the time delay Δtd. Thereafter, the reference torque-distribution command value T1 reaches to the optimal torque-distribution command value T* at the time point t106. As appreciated from the time chart of FIG. 7, in the conventional torque-distribution control system, the response-time delay Δtd results in a great overshoot relative to the optimal wheel speed difference (optimal slippage) between the time points t104 and t106. Substantially from the time point t105, the actual wheel speed difference ΔNR is decreased down to the optimal wheel speed difference ΔN* at a down-gradient (approximately—KΔN), due to the gradually increasing front-wheel side reference torque-distribution command value T1 having the up-gradient KT1. Assuming that a time duration in which the actual wheel speed difference ΔNR overshoots the optimal wheel speed difference ΔN* can be regarded as a slip-loss time tSL, the greater the up-gradient and down-gradient of the actual wheel speed difference ΔNR, the greater the energy loss based on the slip loss or traction loss in case of the same slip-loss time tSL. In actual, the peak point of the overshoot of the wheel speed difference ΔNR is not sharp (as indicated by solid line) but round (as indicated by two-dotted line). However, there is a possibility of the overshoot component after the time point t106, as appreciated from the two-dotted decay curve which overshoots the horizontal line representative of the optimal wheel speed difference ΔN*. In general, it will be appreciated that the greater the up-gradient and down-gradient of the actual wheel speed difference ΔNR, the greater the energy loss in case of the same slip-loss time tSL. As indicated by the two-dotted line of FIG. 7, if there are great positive and negative fluctuations in the actual wheel speed difference ΔNR, such fluctuations may result in hunting in the reference torque-distribution command value calculated based on the detected wheel speed difference $\Delta N$, and thus there is a possibility of hunting in the control system.

Referring now to FIG. 8, the actual wheel speed difference $\Delta N_R$ rapidly drops down to zero with an infinite down-gradient at the time point t201, and rapidly rises up to the optimal wheel speed difference $\Delta N^*$ with the up-gradient $K\Delta N$ at the time point t203 after the shifting time duration $\Delta t$ has elapsed. In FIG. 8, since the front-wheel side torque-distribution limiting value $T_{LIM}$ is slightly less than the front-wheel side reference torque-distribution command value $T_1$ during acceleration, the limiting value $T_{LIM}$ is preset at a slightly lower level than the optimal torque-distribution command value $T^*$. Also, a character $\Delta N_{LIM}$ denotes a conversion of the torque-distribution limiting value $T_{LIM}$ to the wheel speed difference. This conversion $\Delta N_{LIM}$ will be hereinafter referred to as a "limiting value equivalent wheel speed difference". As seen in FIG. 8, the front-wheel side target torque-distribution command value $T_2$ rapidly drops down to the front-wheel side torque-distribution limiting value $T_{LIM}$ with an infinite down-gradient at the time point t202 with the predetermined response-time delay $\Delta t_d$ from the time point t201, and maintained at the limiting value $T_{LIM}$ for a while. Upon the elapsed time has reached to the time point t206 with the response-time delay $\Delta t_d$ from the time point t204 at which the actual wheel speed difference $\Delta N_R$ reaches to the limiting value equivalent wheel speed difference $\Delta N_{LIM}$, the target torque-distribution command value $T_2$ rapidly rises up to the optimal torque-distribution command value $T^*$ with the up-gradient $K_{T2}$. When reached to the limiting value equivalent wheel speed difference $\Delta N_{LIM}$, the reference torque-distribution command value $T_1$ based on the detected wheel speed difference $\Delta N$ exceeds the torque-distribution limiting value $T_{LIM}$, and thus the procedure of FIG. 5 flows from S10 to step S9 so that reference torque-distribution command value $T_1$ is set to the target torque-distribution command value $T_2$. Resultingly, the target torque-distribution command value $T_2$ is converged to the optimal torque-distribution command value $T^*$ with the up-gradient $K_{T2}$ from the time point t206, and reached to the command value $T^*$ at the time point t207. In the improved system, slip loss is less, irrespective of the response-time delay $\Delta t_d$, as compared with the conventional system, for the reasons explained below. Upon the clutch is engaged again at the time point t203 after the shifting time duration $\Delta t$ has elapsed, a portion of the driving torque transmitted from the transmission to the transfer is delivered to the front wheels (auxiliary drive wheels), since the target torque-distribution command value $T_2$ is maintained at the limiting value $T_{LIM}$. Therefore, after the time point t203, the up-gradient $K\Delta N$ of the actual wheel speed difference $\Delta N_R$ is relatively gentle, as compared with the steep up-gradient $K\Delta N$ shown in FIG. 7. Owing to the relatively gentle up-gradient $K\Delta N$ of the actual wheel speed difference $\Delta N_R$, the front-wheel side target torque-distribution command value recovery time duration $\Delta t_{2i}$ ($\Delta t_{21}$, $\Delta t_{22}$, $\Delta t_{23}$, and $\Delta t_{27}$) becomes longer than the front-wheel side reference torque-distribution command value recovery time duration $\Delta t_{1i}$ shown in FIG. 7. The target torque-distribution command value $T_2$ held in the torque-distribution limiting value $T_{LIM}$ can be quickly recovered to the optimal torque-distribution command value $T^*$ at a considerably short time interval as defined between the time points t206 and t207. In total, the response in the torque distribution control may be improved. Irrespective of the relatively gentle up-gradient $K\Delta N$, the actual wheel speed difference $\Delta N_R$ overshoots the optimal wheel speed difference $\Delta N^*$ at the time point t205. From midway between the time points t205 and t207, the actual wheel speed difference $\Delta N_R$ is decreased down to the optimal wheel speed difference $\Delta N^*$ at a down-gradient (approximately—$K\Delta N$). Based on the previously-noted assumption, since the response-time delay $\Delta t_d$ is regarded as a constant time duration, the slip-loss time $t_{SL}$ in the improved system (FIG. 8) is substantially equal to the slip-loss time $t_{SL}$ in the conventional system (FIG. 7). However, since the up-gradient $K\Delta N$ of the actual wheel speed difference $\Delta N_R$ in FIG. 8 is less than that in FIG. 7, energy loss of the improved system in FIG. 8 is smaller than that in FIG. 7. In actual, the peak point of the overshoot of the wheel speed difference $\Delta N_R$ is round as indicated by two-dotted line. Thus, the amplitude in the decay curve indicated by the two-dotted line is relatively small, with the result that the actual wheel speed difference $\Delta N_R$ can be quickly converged to the optimal wheel speed difference $\Delta N^*$ and consequently the reference torque-distribution command value $T_1$ based on the detected wheel speed difference $\Delta N$ can be quickly converged to the optimal torque-distribution command value $T^*$. Accordingly, the improved control system can enhance a responsiveness and reliability in the torque-distribution control.

Figure 9:
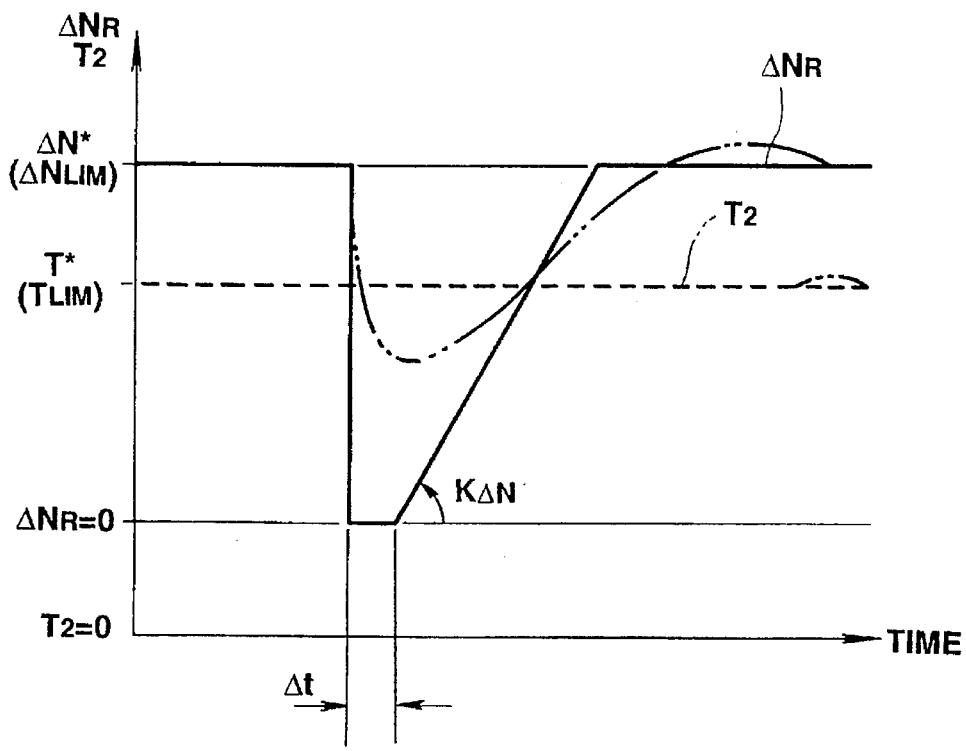
FIG. 9 is a time chart illustrating variations in the torque-distribution command value $T_2$ during shifting in the accelerating state in a modification of the system of the present invention.

As appreciated from the time chart shown in FIG. 8, the more the front-wheel side torque-distribution limiting value $T_{LIM}$ approaches to the reference torque-distribution command value $T_1$ derived just before shifting, the more the limiting value equivalent wheel speed difference $\Delta N_{LIM}$ approaches to the optimal wheel speed difference $\Delta N^*$, i.e., the longer the front-wheel side target torque-distribution command value recovery time duration $\Delta t_{2i}$. On the other hand, energy loss resulting from slip loss can be further reduced. Therefore, supposing that the torque-distribution limiting value $T_{LIM}$ is designed to be identical to the reference torque-distribution command value $T_1$ derived just before shifting, the target torque-distribution command value $T_2$ is maintained at the front-wheel side torque-distribution limiting value $T_{LIM}$ in the event that the delivery of driving torque to the front and rear wheels is temporarily stopped, for example during shifting. In such case, the relation between the actual wheel speed difference $\Delta N_R$ and the target torque-distribution command value $T_2$ is indicated in FIG. 9. Owing to the relatively longer front-wheel side target torque-distribution command value recovery time duration $\Delta t_{2i}$, the up-gradient $K\Delta N$ of the actual wheel speed difference $\Delta N_R$ in FIG. 9 becomes smaller, as compared with that in FIG. 8. Theoretically, since there is no response-time delay, energy loss (slip loss) becomes zero. In actual, as shown in the two-dotted line of FIG. 9, there is slight overshoot of the actual wheel speed difference $\Delta N_R$ relative to the optimal wheel speed difference $\Delta N^*$. In consideration of a delay of mechanical transmission, the actual up-gradient $K\Delta N$ of the wheel speed difference $\Delta N_R$ may become smaller rather than the gradient indicated in FIG. 9. In case of the modification of the control system shown in FIG. 9, energy loss can be reduced to a minimum.

Figure 10:
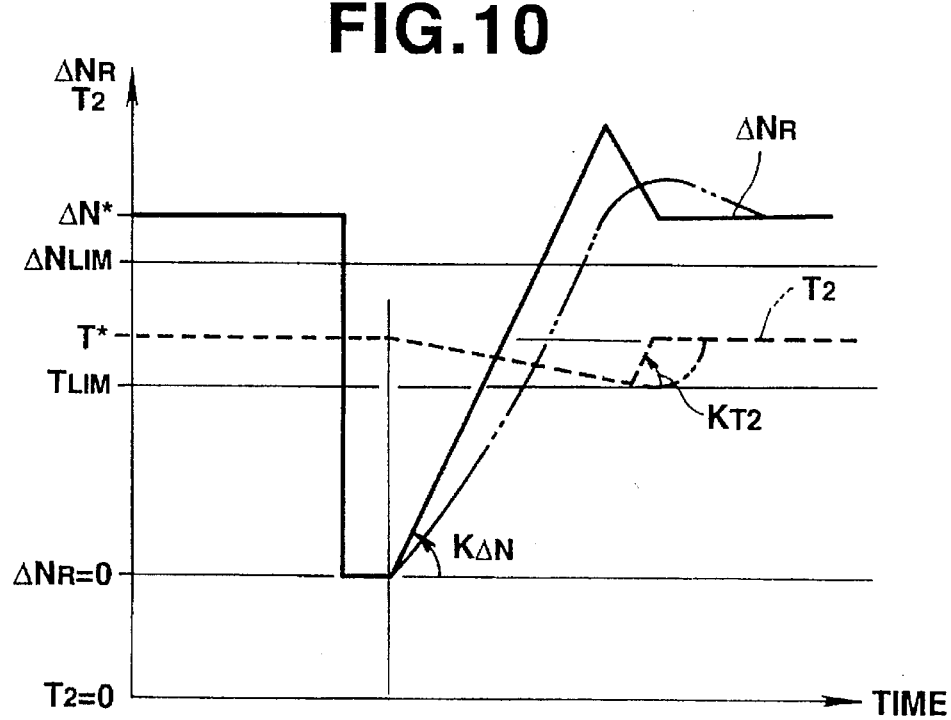
FIG. 10 is another modification of the system of the present invention.

Supposing that it is difficult to minimize the response-time delay in the system, it is advantageous to positively decrease the up-gradient $K\Delta N$ of the wheel speed difference $\Delta N_R$ so as to reduce slip loss or energy loss. This case is exemplified in FIG. 10. The characteristic of the target torque-distribution command value $T_2$ indicated by the broken line of FIG. 10 is different from that of FIG. 8, in that in the modification shown in FIG. 10 the target torque-distribution command value $T_2$ is designed to be gently reduced down to the torque-distribution limiting value $T_{LIM}$ just after the shifting time duration has elapsed, in comparison with the rapid drop in the target torque-distribution command value $T_2$ down to the torque-distribution limiting value $T_{LIM}$ with the infinite down-gradient in a stepwise fashion at the time point t202 in FIG. 8. In case of the modification of FIG. 10, by way of a filtering process, the target torque-distribution command value $T_2$ is reduced gently from the reference torque-distribution command value $T_1$ derived just before disengagement of the clutch down to the torque-distribution limiting value $T_{LIM}$, while maintaining the actually output target torque distribution command value $T_2$ at a higher level than the torque-distribution limiting value $T_{LIM}$ during shifting. Resultingly, the up-gradient $K_{AN}$ of the wheel speed difference $\Delta N_R$ of FIG. 10 tends to be smaller than that of FIG. 8. The smaller up-gradient results in a less overshoot to the optimal wheel speed difference $\Delta N^*$.

In the embodiment, although the torque-distribution limiting value $T_{LIM}$ is calculated on the basis of the detected vehicle speed V and the detected lateral acceleration Yg, the vehicle speed V may be replaced with a longitudinal acceleration exerted on the vehicle body or the lateral acceleration Yg may be replaced with a wheel speed difference between front-left and front-right wheels and/or with a wheel speed difference between rear-left and rear-right wheels. Also, the torque-distribution limiting value $T_{LIM}$ is utilized as a limiter necessary to properly restrict a lower limit of the target torque-distribution command value $T_2$ in the event that the front-wheel side reference torque-distribution command value $T_1$ rapidly drops during shifting for example. As appreciated, in case of detection of rapid increase in an absolute value of the wheel speed difference between front and rear wheels, it is desirable to correct a rate of change in the torque distribution control signal $S_T$ (equivalent to the front-wheel side target torque-distribution command value $T_2$) so that the driving force delivered to the main drive wheels is properly decreased. It is preferable to correct the rate of change in the torque distribution control signal $S_T$ through a proper filtering process as indicated in FIG. 10, for example.

As will be appreciated from the above, in the event that the absolute value of wheel speed difference between front and rear wheels is rapidly decreased and thereafter rapidly increased owing to disengagement and engagement of the clutch for example during shifting, a limiter or a filter is provided to correct the torque distribution delivered to the main drive wheels to a lower rate, whereby a portion of driving torque can be properly delivered to the auxiliary drive wheels so as to effectively reduce loss of traction (energy loss) at the main drive wheels. For instance, during shifting, since the lower limit of the front-wheel side torque-distribution command value is kept at a torque distribution rate close to or equal to the reference torque-distribution command value derived just before the shifting operation, the system assures a higher response in transition to a desired torque distribution.

In the preferred embodiment, the system according to the invention is exemplified in case of the front-engine, rear-wheel drive base mode four-wheel vehicles. It will be appreciated that the concept of the invention can be applied to front-engine, front-wheel drive base mode four-wheel vehicles. In this case, the wheel speed difference between front and rear wheels can be derived as the remainder (nF–nR) by subtracting a rear-wheel speed nR from a front-wheel speed nF.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A driving-torque distribution control system of an automotive vehicle for controlling a torque distribution between front and rear road wheels, said system comprising:

a torque-distribution adjustment means responsive to a control signal for adjusting a distribution of driving torque between said front and rear wheels;

a first detection means for detecting a first physical quantity indicative of a rotational condition of said rear wheel;

a second detection means for detecting a second physical quantity indicative of a rotational condition of said front wheel; and a torque-distribution control means for producing said control signal based on a difference between said first and second physical quantities, wherein said torque-distribution control means includes a correction means for correcting a value of said control signal, by decreasingly compensating a change in said control signal value when satisfying both a first condition in which said difference decreases to a value below a predetermined threshold and a second condition in which an elapsed time, calculated from a time when said first condition has been satisfied, is less than a predetermined time period.

2. The control system as set forth in claim 1, wherein said first and second physical quantities are rear and front wheel speeds, respectively.

3. A driving-torque distribution control system of an automotive vehicle for controlling a torque distribution between front and rear road wheels, one being a main drive wheel and the other being an auxiliary drive wheel, said system comprising:

a torque-distribution adjustment means responsive to a target torque distribution command value for adjusting a distribution of driving torque between said main and auxiliary drive wheels;

a first detection means for detecting a first physical quantity indicative of a rotational condition of said main drive wheel;

a second detection means for detecting a second physical quantity indicative of a rotational condition of said auxiliary drive wheel; and a torque-distribution control means for producing said target torque distribution command value at predetermined sampling time intervals, said torque-distribution control means including a calculating means for calculating a reference torque-distribution command value based on a difference between said first and second physical quantities, and for calculating a torque-distribution limiting value based on a lateral acceleration exerted on the vehicle and a vehicle speed;

wherein said torque-distribution control means selects said torque-distribution limiting value as said target torque-distribution command value when satisfying both a first condition in which said difference decreases to a value below said torque-distribution limiting value and a second condition in which an elapsed time, calculated from a time when said first condition has been satisfied, is less than a predetermined time period.

4. The control system as set forth in claim 3, wherein said first and second physical quantities are main and auxiliary drive wheel speeds, respectively.

5. The control system as set forth in claim 3, wherein said torque-distribution limiting value is preset to be below said reference torque-distribution command value during acceleration of the vehicle and to be above said reference torque-distribution command value during deceleration of the vehicle, during constant-speed running of the vehicle, and during cornering with an acceleration greater than a predetermined amount exerted on the vehicle.

6. A driving-torque distribution control system of a four-wheel drive vehicle with a variable torque transfer for controlling a torque distribution between front and rear road wheels, one being a main drive wheel and the other being an auxiliary drive wheel, said system comprising:

a transfer clutch mechanism responsive to a control signal for adjusting a distribution of driving torque between said main and auxiliary drive wheels;

a main drive wheel speed sensor for detecting a revolution speed of said main drive wheel;

an auxiliary drive wheel speed sensor for detecting a revolution speed of said auxiliary drive wheel; and a controller for producing said control signal based on an absolute value of a wheel speed difference between said main and auxiliary drive wheels, wherein said controller includes a correction means for correcting a value of said control signal, by decreasingly compensating a rate of change in said control signal value when satisfying both a first condition in which said wheel speed difference decreases to a value below a predetermined threshold and a second condition in which an elapsed time, calculated from a time when said first condition has been satisfied, is less than a predetermined time period.

7. The control system as set forth in claim 6, wherein said designated limiting value consists of an auxiliary-wheel side torque-distribution limiting value which varies depending on both a lateral acceleration exerted on the vehicle and a vehicle speed.

* * * * *